US010459791B2

(12) United States Patent
Tanaka et al.

(10) Patent No.: US 10,459,791 B2
(45) Date of Patent: Oct. 29, 2019

(54) STORAGE DEVICE HAVING ERROR COMMUNICATION LOGICAL PORTS

(71) Applicant: Hitachi, Ltd., Tokyo (JP)

(72) Inventors: Katsuya Tanaka, Tokyo (JP); Makio Mizuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 15/545,451

(22) PCT Filed: Feb. 26, 2015

(86) PCT No.: PCT/JP2015/055605
§ 371 (c)(1),
(2) Date: Jul. 21, 2017

(87) PCT Pub. No.: WO2016/135919
PCT Pub. Date: Sep. 1, 2016

(65) Prior Publication Data
US 2018/0011763 A1 Jan. 11, 2018

(51) Int. Cl.
*G06F 11/07* (2006.01)
*G06F 11/10* (2006.01)
(Continued)

(52) U.S. Cl.
CPC ........ *G06F 11/1076* (2013.01); *G06F 3/0605* (2013.01); *G06F 3/0635* (2013.01);
(Continued)

(58) Field of Classification Search
CPC ............ G06F 11/1076; G06F 11/0757; G06F 11/0727; G06F 17/302; G06F 3/0605; G06F 17/30132; G06F 3/0635; G06F 13/10
See application file for complete search history.

(56) References Cited

U.S. PATENT DOCUMENTS 7,010,607 B1 * 3/2006 Bunton ............... H04L 1/18
709/228
7,448,044 B1 * 11/2008 Rust ............... G06F 13/385
709/203

(Continued)

FOREIGN PATENT DOCUMENTS

| JP | 2013-511884 A | 4/2013 |
| WO | 2011/061649 A1 | 5/2011 |
| WO | 2014/162586 A1 | 10/2014 |

OTHER PUBLICATIONS

"Software Transport Interface", InfiniBand Architecture Specification vol. 1 Release 1.21, Nov. 2007, Written by InfiniBand Trade Association, pp. 465-466 and 685.

(Continued)

Primary Examiner — Tasnima Matin
(74) Attorney, Agent, or Firm — Mattingly & Malur, PC

(57) ABSTRACT

A storage device according to an embodiment of the present invention has a plurality of storage nodes, each of which has a plurality of logical ports having send and receive queues for a communication request and an identification number, and an internal network for connecting the plurality of storage nodes with one another. The storage nodes each have, as the logical ports, a data communication logical port used for data communication with other storage nodes and an error communication logical port used to notify the other storage nodes of a state of the data communication logical port. When detecting an occurrence of transition of the data communication logical port to an error state, the storage node uses the error communication logical port to notify the other storage nodes of the identification number and the state of the data communication logical port.

20 Claims, 17 Drawing Sheets

(51) Int. Cl.
   *G06F 16/172* (2019.01)
   *G06F 16/182* (2019.01)
   *G06F 13/10* (2006.01)
   *G06F 3/06* (2006.01)

(52) U.S. Cl.
   CPC ...... *G06F 11/0727* (2013.01); *G06F 11/0757* (2013.01); *G06F 13/10* (2013.01); *G06F 16/172* (2019.01); *G06F 16/1827* (2019.01)

(56) References Cited

U.S. PATENT DOCUMENTS

| | | | |
|---|---|---|---|
| 2004/0146005 A1* | 7/2004 | Rim | H04L 12/5601 370/217 |
| 2004/0165525 A1* | 8/2004 | Burak | H04L 45/06 370/228 |
| 2006/0072459 A1* | 4/2006 | Knight | G06F 13/385 370/235 |
| 2009/0063891 A1* | 3/2009 | Arimilli | G06F 11/0793 714/2 |
| 2013/0024563 A1* | 1/2013 | Torigoe | H04L 69/40 709/224 |
| 2015/0052176 A1 | 2/2015 | Akaike et al. | |
| 2017/0026278 A1* | 1/2017 | Tsutsumi | H04L 45/28 |

OTHER PUBLICATIONS

International Search Report of PCT/JP2015/055605 dated May 19, 2015.

\* cited by examiner

FIG.13

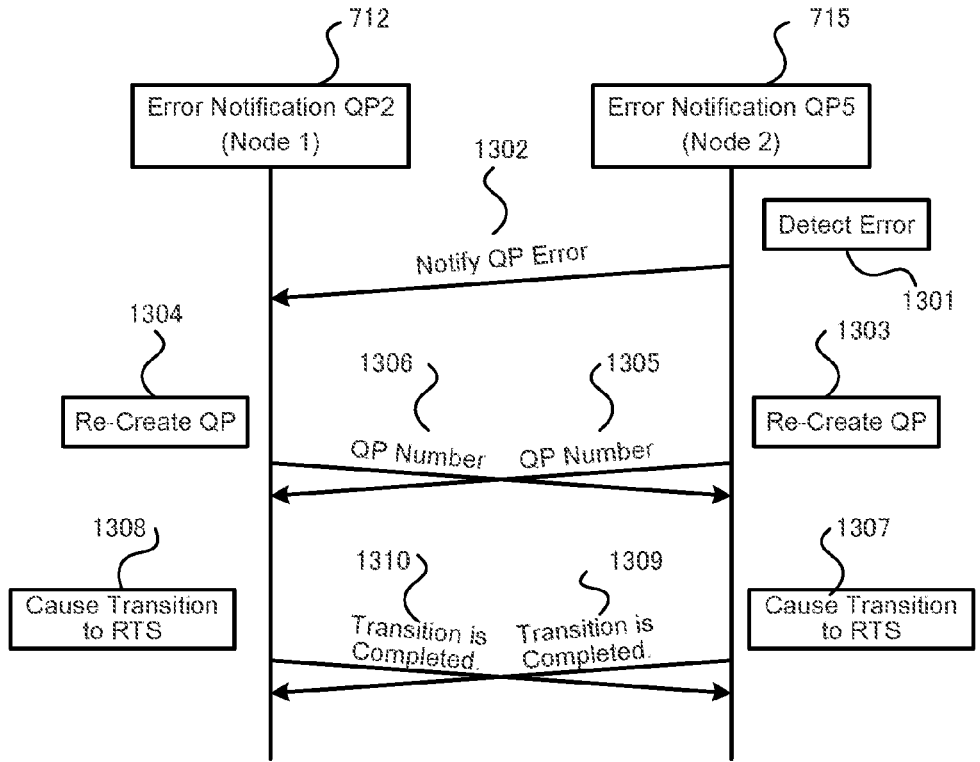

FIG.14

| Type | Infiniband Standard | Present Example |
|---|---|---|
| Port Physical Error | Link Down is Detected with Asynchronous Event Generated by HCA or Subnet Manager Agent Detects Link Down, Etc., and Notifies The Same to Subnet Manager. | Same as on The Left |
| Intermittent Error | Sending Destination QP Detects Discontinuous of Sequence Number, and Notifies The Same to Sending Source QP. | Same as on The Left |
| Error Due to Software Bug | When QP Causes Error without Permission from Communication Partner, Sending Source QP Detects Sending Destination QP Error with Local ACK Timeout. | When Error Occurs in Data Transfer QP, Failure Monitoring Program Notifies The Same to Communication Partner through Error Notification QP. |

STORAGE DEVICE HAVING ERROR COMMUNICATION LOGICAL PORTS

TECHNICAL FIELD

The present invention relates to a storage device configured by coupling a plurality of processing nodes with one another through a network.

BACKGROUND ART

A storage device having a cluster configuration, in which a plurality of storage nodes are assembled, operates each storage node in parallel to thereby be able to realize high data access performance by parallel access and realize high availability due to data redundancy. For example, Patent Document 1 discloses configuring a large-scale storage device by interconnecting a plurality of storage nodes through a network. In the following description and drawings, an internal network of the storage device in which a plurality of storage nodes is connected is referred to as a storage internal network. The storage node is sometimes simply referred to as a node.

The storage node generally has a storage controller and a randomly accessible nonvolatile recording medium. The recording medium is a disk array having a large number of hard disk drives and nonvolatile semiconductor memory drives, for example. The storage controller has a front end interface for connecting a host device (host system or the like), a back end interface for connecting a disk array, and a cache memory temporarily storing user data which the host device reads from and writes in the disk array. The storage controller further has a control memory storing control data to be handled in the storage controller and a processor for controlling the data transfer of the user data and the control data. In the storage device in which a plurality of storage nodes is connected, the plurality of storage nodes sends and receives the user data and the control data between the nodes through the storage internal network.

As the standard of a network suitable for connection between computer nodes including the storage node, "Infini-Band" of Non-Patent Document 1 is known. Moreover, an improved technique relating to the InfiniBand of Patent Document 2 is known.

CITATION LIST

Patent Documents

Patent Document 1: International Publication WO 2014/162586

Patent Document 2: Japanese Unexamined Patent Application Publication (Translation of PCT International Application) No. 2013-511884

Non-Patent Document

Non-Patent Document 1: "InfiniBand Architecture Specification Volume 1 Release 1.2.1", Published in 2007, Written by InfiniBand Trade Association, p.p. 465-466 and 685

SUMMARY OF THE INVENTION

Problem to be Solved by the Invention

In the InfiniBand (hereinafter abbreviated as IB), a logical port is referred to as a Queue Pair (hereinafter abbreviated as QP). In a storage internal network to which the IB is applied, user data and control data are sent and received among the QPs provided in a plurality of storage nodes. The QP has a state, such as Reset, Init, RTR (Ready To Receive), RTS (Ready To Send), or Error. When an error occurs in the contents of a request sent and received between the QPs due to a software bug of a data transfer control program, for example, the QP sometimes causes the transition to Error state. When a receive side QP detects an error of a request, the receive side QP returns an NAK (Negative Acknowledge) to a send side QP, so that both the send side QP and the receive side QP cause the transition to Error state. However, when the contents of a request to be posted to the send side QP by the data transfer control program has an error, only the send side QP sometimes causes the transition to Error state without notification to the receive side QP. According to the IB standard, the QP which has caused the transition to Error state does not perform sending and receiving including the response of an ACK/NAK or the like. As a result, when only either one of the QPs causes the transition to Error state, the QP in the normal state detects a QP error of a communication partner due to timeout (Local ACK Timeout).

In the storage internal network which is required to have high reliability, it is a requirement not to cause host timeout, even in the case of the occurrence of a failure, by continuing data transfer promptly using an alternative path. For example, it is required to detect a failure within 100 milliseconds. However, in a currently available Host Channel Adapter (hereinafter abbreviated as HCA) of the IB, settable timeout values are about 0.14 to 0.5 second, which has posed a problem in that it takes about 0.14 to 0.5 second to detect timeout at the shortest, and thus the requirement for the storage internal network cannot be satisfied.

The present invention has been made in view of the above-described problems. It is a main object of the present invention to provide a method for detecting an error of a communication partner QP without depending on a timeout value settable in the HCA in a storage device in which the IB is applied to a storage internal network.

Means for Solving the Problems

A storage device according to one embodiment of the present invention has a plurality of storage nodes, each of which has a plurality of logical ports having send and receive queues for a communication request and an identification number, and an internal network interconnecting the plurality of storage nodes. Each of the storage nodes has, as the logical ports, a data communication logical port used for data communication with other storage nodes and an error communication logical port used in order to notify the other storage nodes of the state of the data communication logical port. When detecting the transition of the data communication logical port to an error state, the storage node notifies the other storage nodes of the identification number and the state of the data communication logical port using the error communication logical port.

Advantageous Effect of the Invention

According to the storage device of one embodiment of the present invention, an error of a logical port of a communication partner is detectable in a shorter time than the timeout time detectable by the HCA.

BRIEF DESCRIPTION OF THE DRAWINGS

FIG. 13 is a view explaining communication between the error notification QPs in Example 1.

FIG. 14 is a view explaining the type of a failure of the storage internal network and a method for detecting and notifying the failure.

MODES FOR CARRYING OUT THE INVENTION

Figure 1:
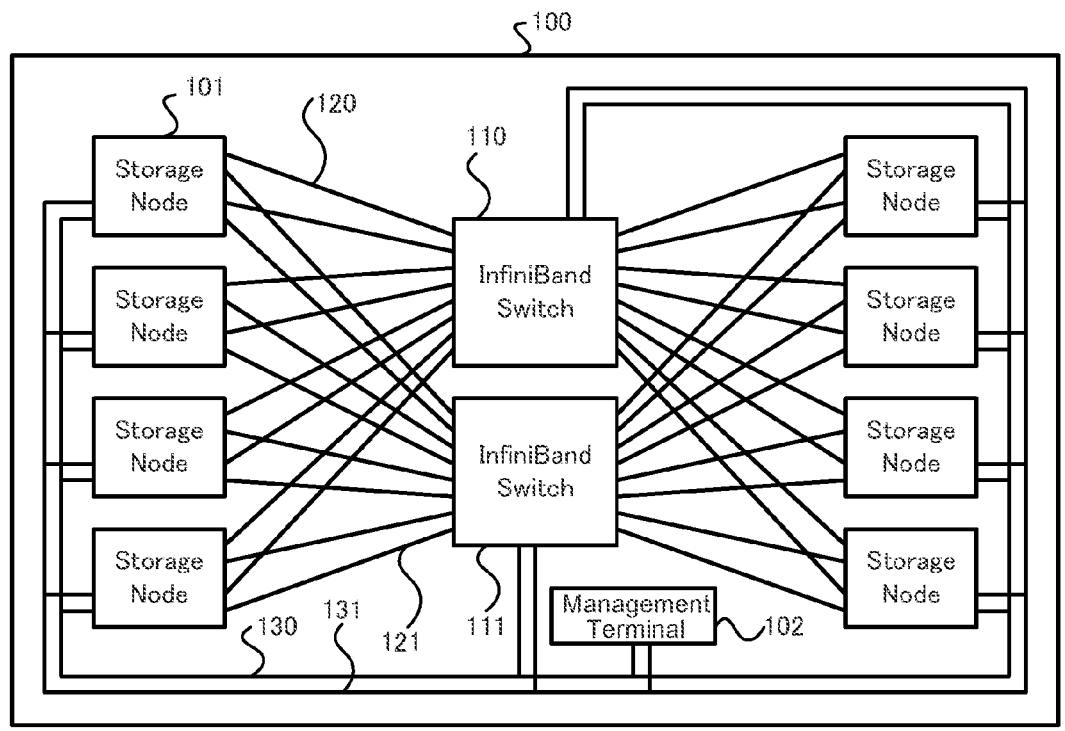
FIG. 1 is a view explaining a storage device of Example 1.

Hereinafter, some Examples of the present invention are described with reference to the drawings. Through all the Examples, constituent components designated by the same reference numerals are substantially the same. Processing is sometimes described using a "program" as the subject. The program is executed by a processor, e.g., a CPU (Central Processing Unit), and performs predetermined processing. The processing to be executed by the processor is performed using memory resources (for example, memory) and communication interface devices (for example, communication port) as appropriate, and therefore the subject of the processing may be a processor. The processor may have dedicated hardware other than the CPU.

Example 1

With reference to FIG. 1 to FIG. 14, a storage device according to Example 1 is described. First, the outline of Example 1 is described. Each storage node provided in the storage device uses QPs which are logical communication ports (logical ports) for sending and receiving data among the storage nodes. The storage node has a QP only for error notification aside from a data transfer QP transferring user data or control data. When the data transfer QP causes the transition to an Error state, a failure monitoring program notifies a storage node which is a communication partner of the data transfer QP of the occurrence of a QP error through the error notification QP. The storage node, which is notified of the QP error, destroys the QP corresponding to the contents of the error notification, and then re-creates a QP.

FIG. 1 is a view explaining the hardware configuration of the storage device in Example 1.

A storage device 100 of Example 1 has a plurality of storage nodes 101 (indicated as "Storage Node" in FIG. 1) which are interconnected through an internal network. The internal network is referred to as a storage internal network in this specification. In the storage device 100 according to Example 1, a network built with switches and links of the InfiniBand standard is used for the storage internal network, for example. The storage nodes 101 are interconnected through InfiniBand Switches (IB switches) 110 and 111.

The storage nodes 101 and the IB switches 110 and 111 are connected by IB links 120 and 121, respectively. The storage nodes 101 and the IB switches 110 and 111 are connected to a management terminal 102 through management networks 130 and 131. An administrator of the storage device 100 can perform setting, failure monitoring, and maintenance operations of the storage device 100 through the management terminal 102. The storage nodes 101 can also exchange information required for starting data transfer on the IB network with one another through the management networks 130 and 131. The information exchanged herein is an LID (Local Identifier) of IB ports, a QP number, and the like, for example.

Figure 2:
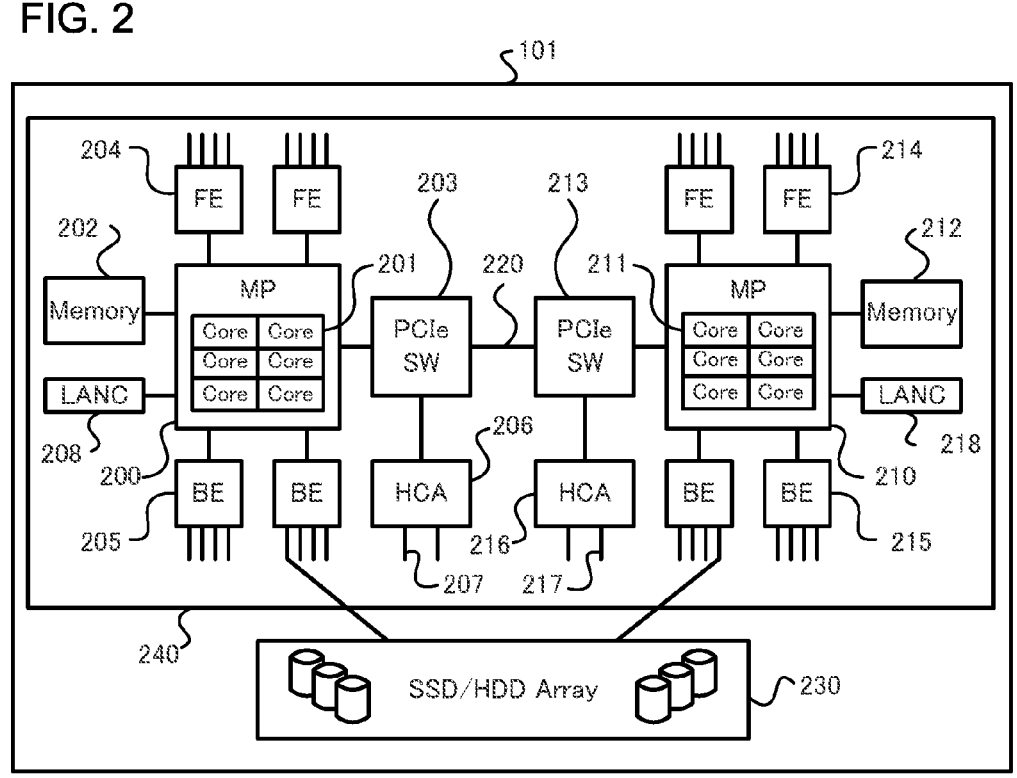
FIG. 2 is a view explaining a storage node.

FIG. 2 is a view explaining the hardware configuration of the storage node in Example 1.

The storage node 101 has a storage controller 240 and a disk array 230 having a plurality of hard disk drives (HDD) or a plurality of solid state drives (SSD).

The storage controller 240 has processors (MP) 200 and 210, memories 202 and 212, front end interfaces (FE) 204 and 214, back end interfaces (BE) 205 and 215, and management network interfaces (LANC) 208 and 218. The processors 200 and 210 each have a plurality of processor cores 201 and 211.

A host system (not illustrated) accessing the storage device 100 is connected to the storage device 100 through the front end interfaces 204 and 214. The host system and the front end interfaces 204 and 214 are connected to each other with transmission lines, such as Fibre Channel cables. Alternatively, a configuration may be acceptable in which the host system and the front end interfaces 204 and 214 are connected to each other through a Storage Area Network configured of a plurality of transmission lines and a plurality of switches. The front end interfaces 204 and 214 convert a data transfer protocol between the host system and the storage nodes 101 and a data transfer protocol inside the storage controller 240.

The disk array 230 is connected to the storage controller 240 through the back end interfaces 205 and 215. The back end interfaces 205 and 215 convert a data transfer protocol inside the storage controller 240 and a data transfer protocol between the storage controller 240 and the disk array 230.

The management network interfaces 208 and 218 connect the storage node 101 to the management terminal 102 through the management networks 130 and 131. The processors 200 and 210 control data transfer between the host system connected through the front end interfaces 204 and 214 and the disk array 230 connected through the back end interfaces 205 and 215 and among the storage nodes. The memories 202 and 212 are the main memories of the processors 200 and 210, respectively, and store programs (storage control program and the like) to be executed by the processors 200 and 210, a management table to which the processors 200 and 210 refer, and the like. Moreover, the memories 202 and 212 are used also as cache memories of the storage nodes 101.

The storage controller 240 further has PCIe switches (PCIe SWs) 203 and 213 and HCAs 206 and 216. The PCIe switch 203 and the PCIe switch 213 are connected to each other through a Non-Transparent link 220. The processors 200 and 210 can communicate with each other through the Non-Transparent link 220.

The HCAs 206 and 216 each have one or more physical ports for connecting the IB links. The physical port is referred to as an IB port. In the storage device 100 according to this example, the HCA 206 has at least an IB port 207 and the HCA 216 has at least an IB port 217. The HCAs 206 and 216 are connected to the processors 200 and 210 through the PCIe switches 203 and 213, respectively. The processors 200 and 210 are connected to the IB switches 110 and 111 through the IB ports 207 and 217 and the IB links 120 and 121, respectively. As a result, the storage nodes 101 can communicate with each other.

Figure 3:
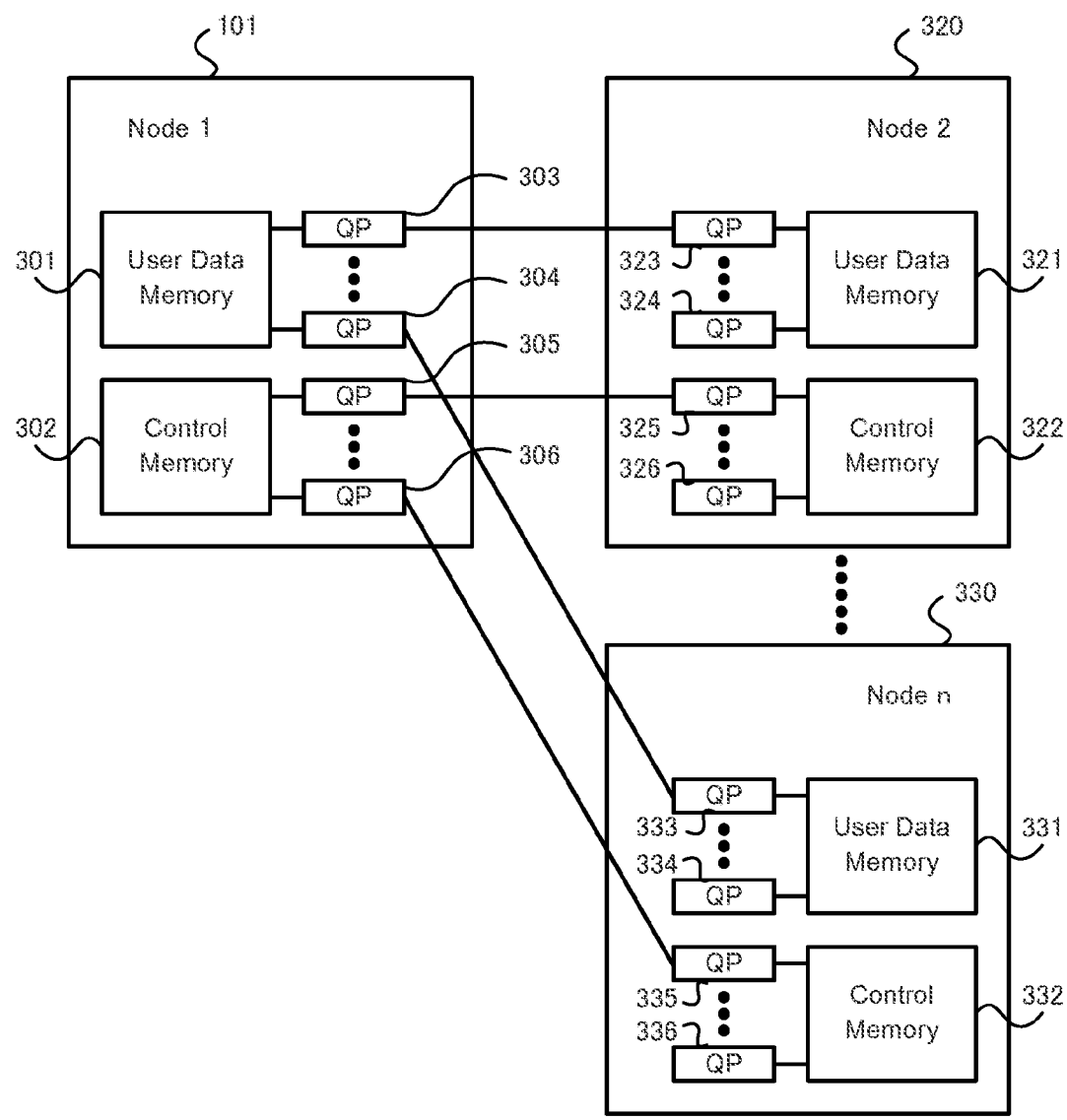
FIG. 3 is a view explaining logical connection among storage nodes.

FIG. 3 is a view explaining the logical connection through the IB network among the storage nodes in Example 1.

Each memory (memory 202 and memory 212) in each storage node has a user data memory region storing user data received from the host system and a control memory region storing control data in the storage device. In the user data memory region, a cache memory of the storage node and a buffer region used by the front end interfaces or the back end interfaces are assigned. A storage node 1 (101) has a user data memory region 301 and a control memory region 302. Similarly, a storage node 2 (320) has a user data memory region 321 and a control memory region 322. A storage node n (330) has a user data memory region 331 and a control memory region 332.

In IB, when the process of each node performs communication, a Queue Pair (QP) which is a logical communication port (logical port) is used. Since the details of IB standard are described in Non-patent Document 1, for example, only matter required for describing this example is explained herein.

Each QP has at least a Send Queue (sometimes indicated as "SQ") storing a send request and a Receive Queue (sometimes indicated as "RQ") storing a request received from another node. The SQ and the RQ are associated with a Completion Queue (sometimes indicated as "CQ") for storing a request the processing for which is completed. When the request stored in the SQ or the RQ is processed, process completion (Completion Queue Entry, which is indicated as "CQE") is stored in the CQ which is associated with the SQ or the RQ. Each QP further has a QP number which is a unique identification number. The QP number is a value automatically assigned by the HCA when the QP is created.

Since the QP is a logical communication port, the QP can be freely created or discarded by executing a program by the processors (MPs 200 and 210) of the node. With respect to the QP, the QP can be created by the execution of ibv_create_qp( ) of the IB Verbs API by the storage node and discarded (destroyed) by the execution of ibv_destroy_qp( ) by the storage node. However, when creating a QP, the memory resources are consumed for the SQ, RQ, and the like of the QP, therefore the QP cannot be created without any restriction.

Each QP has a state, such as Reset, Init (Initialized), RTR (Ready To Receive), RTS (Ready To Send), or Error. Immediately after a QP is created, the state of the QP is Reset state. The storage node can change (can cause transition of) the state of the QP to Init from Reset by executing ibv_modify_qp( ) of the IB Verbs API.

When the state of the QP is Init, sending and receiving of a request using the QP cannot be performed. In order to enable the sending and the receiving of a request, it is necessary to cause the transition of the state of the QP to RTS. However, in order to cause the transition of the QP in Init state to RTS state, it is necessary to cause the transition of the QP to RTR state once. The state of the QP can be changed to RTR by executing ibv_modify_qp( ) to the QP in Init state. The QP in RTR state can receive a request but cannot send a request. By changing the state of the QP to RTS from RTR, the QP enters a state where the QP can send and receive a request.

When the transition of the state of the QP to RTR state is caused, it is necessary to specify the QP number of a QP serving as a communication partner (communication destination) of the QP. More specifically, in order to cause the QP to enter the state in which the QP can send and receive a request (enter RTS state), it is necessary to cause the transition of the state of the QP to RTR and, in order to cause the transition of the state of the QP to RTR state, the QP number of a QP serving as a communication partner is required. Therefore, in order to cause a QP (Reset state) newly created in the node and a QP in Init state to enter the state where the QP can send and receive a request, it is necessary to acquire the QP number of a QP of a communication partner destination.

When an error occurs while processing a request, the state of the QP may change into Error. When the state of the QP is Error, the data communication in the QP is disabled. In order to cause the QP in Error state to enter the state where the QP is usable again, it is necessary to cause the transition of the QP to Reset state once, and then cause the transition of the QP to Init, RTR, and RTS states from Reset state.

In the RC (Reliable Connection) service of the IB, the QP is required for each node serving as a communication partner and each process of manipulating the QP. Furthermore, the user data and the control data are transferred with different service levels (priority of data transfer), and therefore the QP is required for each data transfer memory region. Accordingly, each storage node has an individual QP at least for each memory region and for each storage node to be connected. For example, the storage node 1 (101) has a QP 303 for transferring data of the user data memory region 301 to the user data memory region 321 of the storage node 2 (320). Moreover, the storage node 1 (101) has a QP 304 for transferring the data of the user data memory region 301 to the user data memory region 331 of the storage node n (330). The storage node 1 (101) further has a QP 305 for transferring the data of the control memory region 302 to the control memory region 322 of the storage node 2 (320). The storage node 1 (101) further has a QP 306 for transferring the data of the control memory region 302 to the control memory region 332 of the storage node n (330).

Similarly, the storage node 2 (320) has a QP 323 for transferring the data of the user data memory region 321 to the user data memory region 301 of the storage node 1 (101). Moreover, the storage node 2 (320) has a QP 324 for transferring the data of the user data memory region 321 to the user data memory region 331 of the storage node n (330). The storage node 2 (320) further has a QP 325 for transferring the data of the control memory region 322 to the control memory region 302 of the storage node 1 (101). The storage node 2 (320) further has a QP 326 for transferring the data of the control memory region 322 to the control memory region 332 of the storage node n (330).

Similarly, the storage node n (330) has a QP 333 for transferring the data of the user data memory region 331 to the user data memory region 301 of the storage node 1 (101). Moreover, the storage node n (330) has a QP 334 for transferring the data of the user data memory region 331 to the user data memory region 321 of the storage node 2 (320). The storage node n (330) further has a QP 335 for transferring the data of the control memory region 332 to the control memory region 302 of the storage node 1 (101). The storage node n (330) further has a QP 336 for transferring the data of the control memory region 332 to the control memory region 322 of the storage node 2 (320).

More specifically, each storage node has QPs according to the product of the number of the types of the memory regions in the node performing data transfer by the QPs, the connection node number n, and the number of processes of manipulating the QPs in each node. In principle, bi-directional communication between two QPs can be performed.

Furthermore, each storage node may have an alternative QP in preparation for a case where a failure occurs in a QP (QP causes the transition to Error state), so that communication is disabled.

Figure 4:
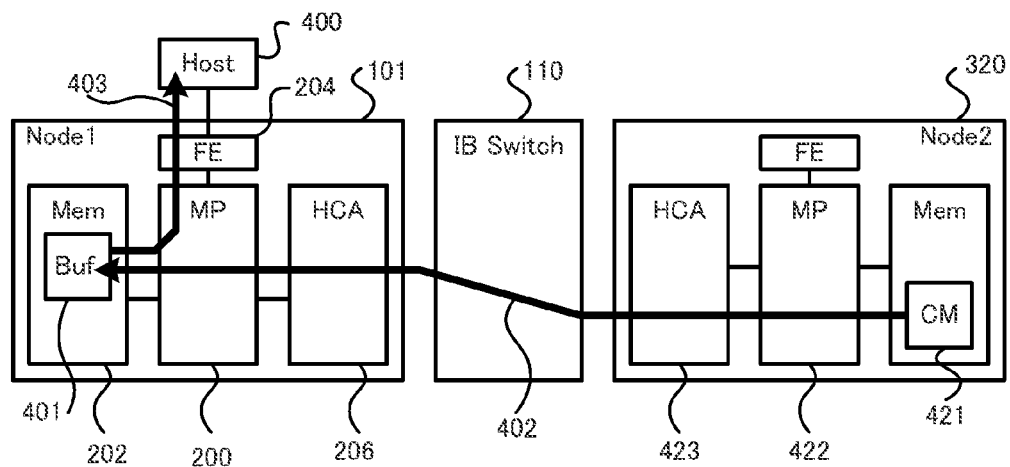
FIG. 4 is a view explaining a Read operation of the storage device.

FIG. 4 is a view explaining an operation when receiving a Read request from a host system in the storage device 100 of Example 1. In FIG. 4, the PCIe switches connecting HCAs (206, 423) and processors (200, 422) are omitted.

A host system 400 is connected to the front end interface 204 of the storage node 1 (101). It is supposed that the front end interface 204 receives a Read request from the host system 400. Then, it is supposed that the data required by the host system 400 is stored in a cache memory 421 of the storage node 2 (320).

The processor 200 of the storage node 1 (101) sends a read-out request of the data in the cache memory 421 from the HCA 206 to an HCA 423. Specifically, due to the fact that the data transfer control program is executed by the processor 200, the processor 200 posts a data read-out request (for example, RDMA Read request) to a communication QP with the storage node 2 (320) among the plurality of QPs prepared in the storage node 1 (101). "Post" means an operation of storing a request in the Send Queue of the QP. Thus, the request is sent to the HCA 423.

The storage node 2 (320) receiving the request transfers the read-out data in the cache memory 421 to a buffer region 401 in the memory 202 through a path 402 via the processor 422, the HCA 423, the IB switch 110, the HCA 206, and the processor 200. The front end interface 204 transfers the read-out data stored in the buffer region 401 to the host system 400 (403).

Alternatively, a control may be performed so that the data in the cache memory 421 is sent from the storage node 2 (320) to the storage node 1 (101) using an RDMA Write request. In that case, the processor 200 first posts a request (for example, RDMA Write request) of transferring a message, which requests the processor 422 to send read-out data, to a communication QP with the storage node 2 (320). The processor 422 receiving the message posts an RDMA Write request of transferring the read-out data to a communication QP with the storage node 1 (101).

Figure 5:
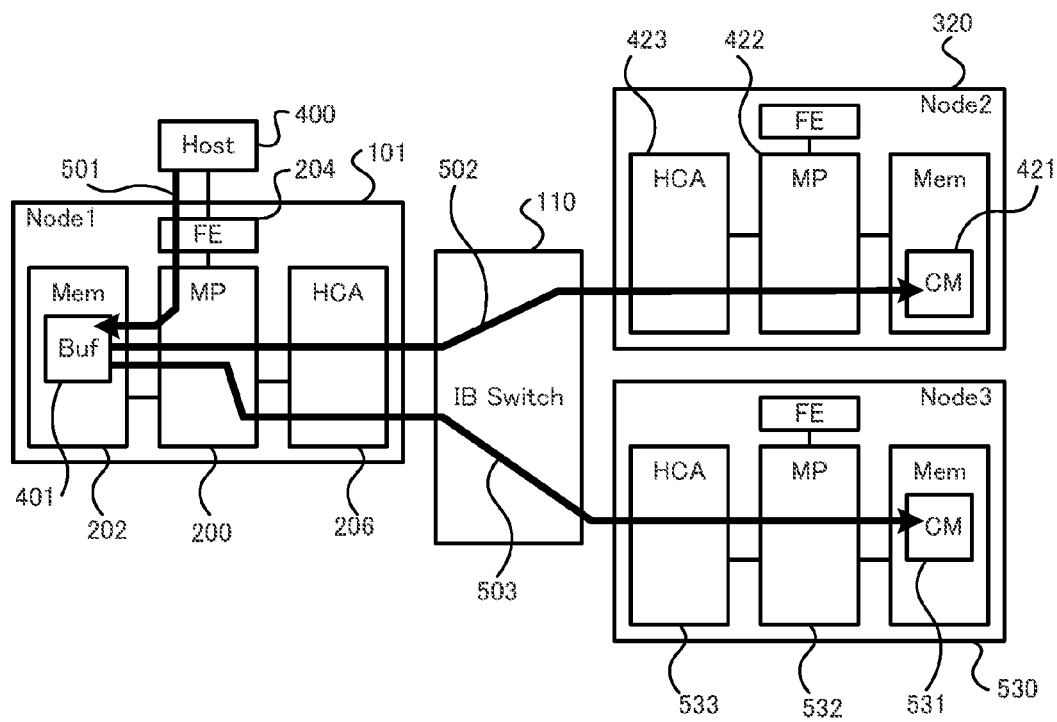
FIG. 5 is a view explaining a Write operation of the storage device.

FIG. 5 is a view explaining an operation in the storage device 100 of Example 1 when receiving a Write request from the host system. PCIe switches connecting processors (200, 422, 532) and HCAs (206, 423, 533) are omitted.

A write data received from the host system 400 is stored in the buffer region 401 in the memory 202 (501). It is supposed that the storage region of the storage node 2 (320) is instructed as the write destination of the write data received from the host system 400 by the storage control program.

The processor 200 transfers the write data in the buffer 401 to the cache memory 421 of the storage node 2 (320) through the HCA 206, the IB switch 110, the HCA 423, and the processor 422 (502). In order to make the write data redundant, the processor 200 transfers the write data to a cache memory 531 of a storage node 3 (530) through the HCA 206, the IB switch 110, the HCA 533, and the processor 532 (503). After the write in the cache memories in the two storage nodes is completed, the front end interface 204 notifies the host system 400 of the completion of the write. Also in this case, as with the processing when receiving the Read request, the processor 200 performs data transfer by posting a data write request (for example, RDMA Write request) to a communication QP with the storage node 2 (320) among the plurality of QPs prepared in the storage node 1 (101). Moreover, the processor 200 performs data transfer by posting a data write request also to a communication QP with the storage node 3 (530).

Figure 6:
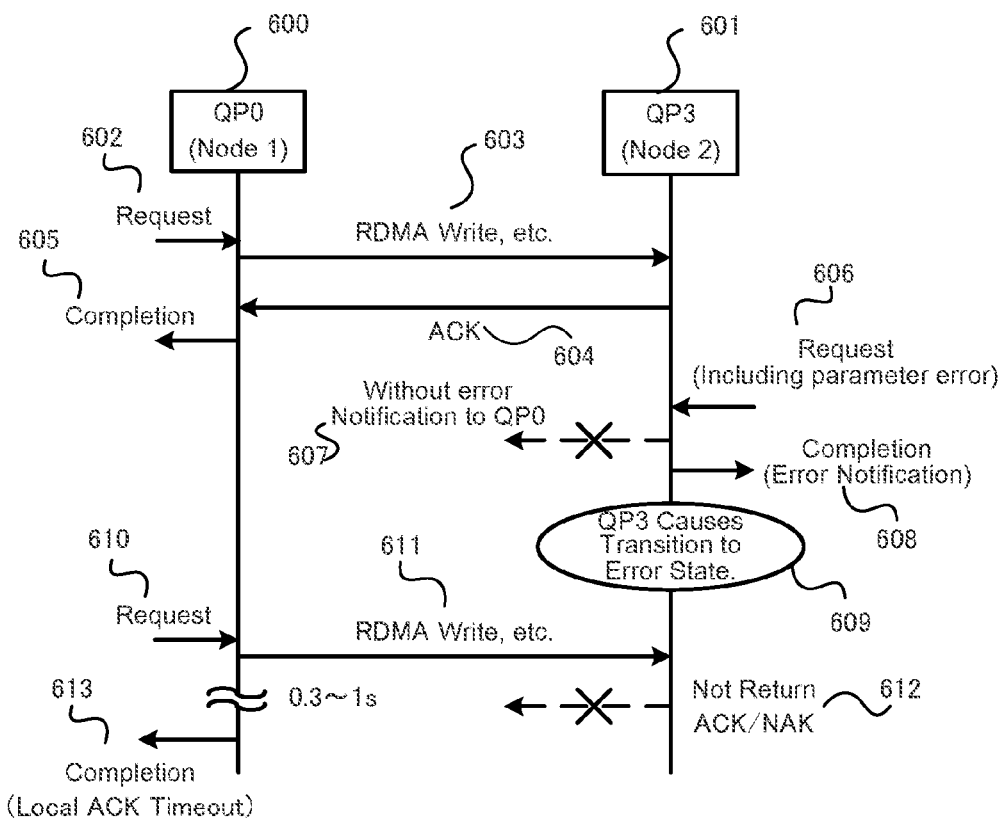
FIG. 6 is a view explaining an example of the occurrence of Local ACK Timeout.

FIG. 6 is a view explaining an example in which Local ACK Timeout occurs in a standard IB network. As an example, a case is assumed where a QP 0 (600) and a QP 3 (601) bi-directionally perform data transfer.

First, an operation when both the QP 0 (600) and the QP 3 (601) are normal is described. The data transfer control program operating in the node 1 posts a request to the QP 0 (600) (602). For example, when the content of the request is an RDMA Write operation, the QP 0 (600) sends an RDMA Write request packet to the QP 3 (601) (603). The QP 3 (601) receiving the RDMA Write performs writing in a memory of the node 2 according to the content of the request, and then returns an ACK to the QP 0 (600) (604). The data transfer control program operating in the node 1 acquires a completion from a Completion Queue connected to the QP 0 (600) to confirm that the request is normally completed (605).

Next, an operation when the QP 3 (601) causes the transition to Error state is described. Contrary to the above-described operation, the data transfer control program operating in the node 2 posts a request to the QP 3 (601) in order to perform data transfer from the QP 3 (601) to the QP 0 (600). Herein, it is proposed that a parameter error is included in the contents of the request due to a bug of the data transfer control program, for example (606). Then, the QP 3 (601) outputs, without performing error notification to the QP 0 (600) which is a communication partner (607), a completion showing the occurrence of an error in the QP 3 (601) to the Completion Queue connected to the QP 3 (601) (608). Then, the QP 3 (601) causes the transition to Error state. According to the IB standard, the QP which has caused the transition to Error state does not perform sending and receiving at all.

As another example in which the QP causes the transition to Error state without permission from a communication partner in this way, a case is mentioned where an error, such as an overflow, occurs in the Send Queue and the Receive Queue of the QP or the Completion Queue.

Thereafter, it is supposed that the data transfer control program operating in the node 1 posts an RDMA Write request to the QP 0 (600) (610). The QP 0 (600) sends an RDMA Write request packet to the QP 3 (601) (611). However, since the QP 3 (601) changed to Error state, the QP 3 (601) does not return an ACK/NAK (612). The QP 0 (600) outputs a Local ACK Timeout error to the Completion Queue after the passage of a predetermined timeout time (613). In a currently available HCA, the timeout value is about 0.14 to 0.5 second. Therefore, it takes at least about 0.14 to 0.5 second for the data transfer control program operating in the node 1 to detect a QP error of a communication partner. When such long timeout occurs in the operation of FIG. 4 or FIG. 5, the host system 400 may judge that a failure has occurred in the storage device 100.

Figure 7:
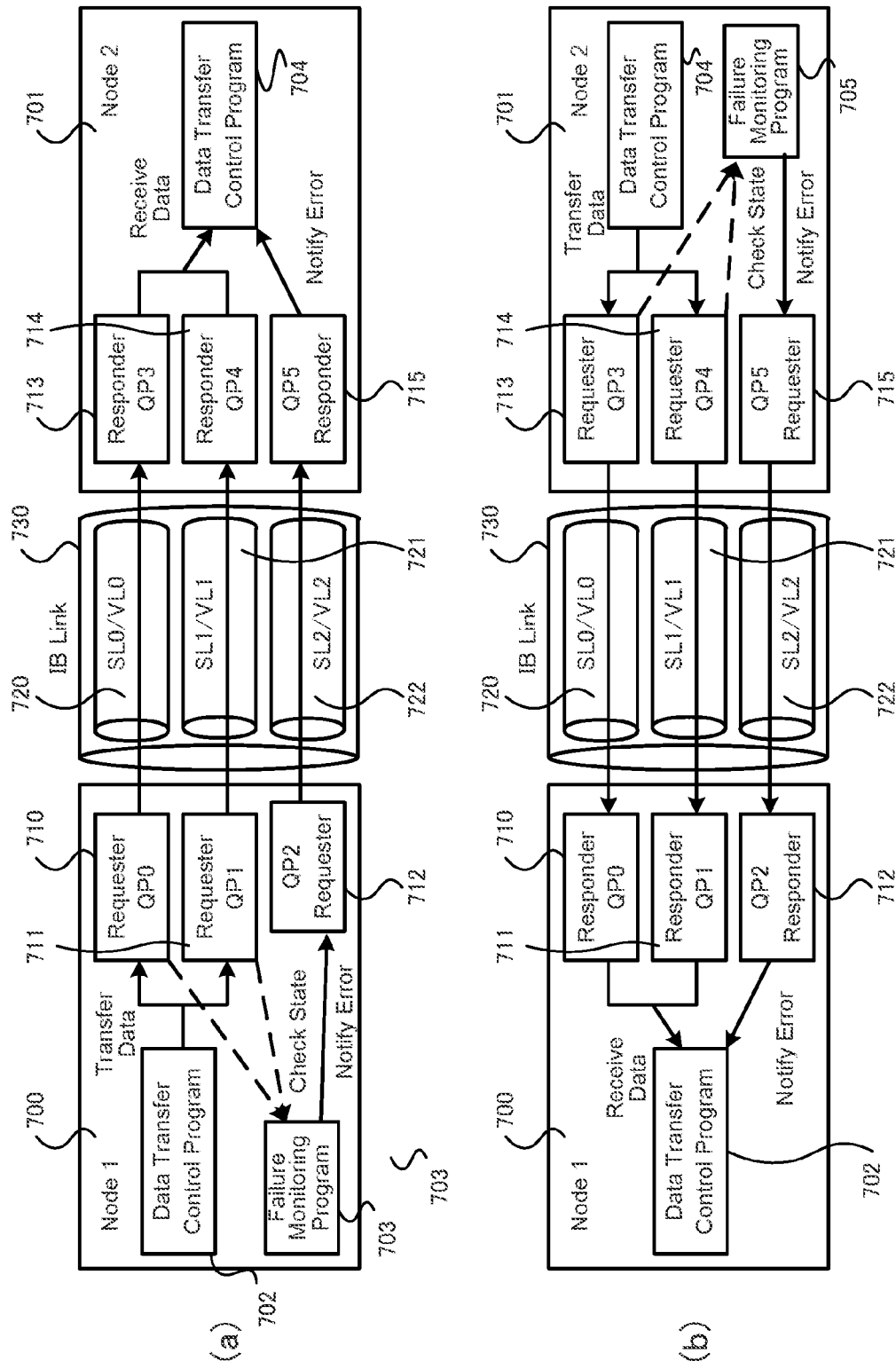
FIG. 7 are views explaining a QP error detection method in Example 1.

FIG. 7 are views explaining a QP error detection method in Example 1. FIG. 7(*a*) illustrates a case where data is transferred from the node 1 to the node 2. FIG. 7(*b*) illustrates a case where data is transferred from the node 2 to the node 1. In FIG. 7, an IB switch connecting the storage node 1 (700) and the storage node 2 (701) is omitted for ease of the description. In FIG. 7(*a*) and FIG. 7(*b*), the node 1 has a user data transfer QP 0 (710), a control data transfer QP 1 (711), and an error notification QP 2 (712). Similarly, the node 2 has a user data transfer QP 3 (713), a control data transfer QP 4 (714), and an error notification QP 5 (715). The node 1 and the node 2 are connected through an IB link 730 having three virtual lanes 720, 721, and 722. The user data transfer QP and the control data transfer QP are collectively referred to as a "data transfer QP".

Herein, the correspondence between the service levels and the virtual lanes in Example 1 is described, and then the description returns to the description of FIG. 7 again.

Figure 8:
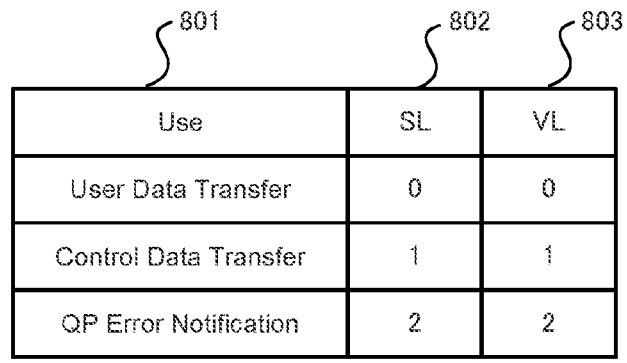
FIG. 8 is a view explaining the correspondence between SL and VL in Example 1.

FIG. 8 is a view explaining the correspondence between the service levels and the virtual lanes in Example 1 and illustrates the correspondence between the use of the data transfer 801, a service level (SL) 802 to be used, and a virtual lane (VL) 803 associated with the service level. The storage device 100 of Example 1 sets the service level 0 to a QP for performing user data transfer (for example, the user data transfer QP 0 (710) in FIG. 7), and then assigns the virtual lane 0 thereto. Moreover, the storage device 100 sets the service level 1 to a QP for performing control data transfer (for example, control data transfer QP 1 (711) in FIG. 7), and then assigns the virtual lane 1 thereto. Furthermore, the storage device 100 sets the service level 2 to a QP for performing an error notification (for example, error notification QP 2 (712) in FIG. 7), and then assigns the virtual lane 2 thereto.

When the service level is higher, the priority of the data transfer becomes higher. Since independent virtual lane is assigned for each of the use of the data transfer, data for the error notification is preferentially transferred even when congestion due to the user data transfer occurs on the IB link. When the number of the virtual lanes which can be assigned to the IB link is small, the same virtual lane is shared for the control data and the error notification, to make the service level of the error notification be higher than at least the service level of the user data transfer. Moreover, separate virtual lanes are assigned at least to the user data transfer and the error notification.

The description returns to the description of FIG. 7. FIG. 7(*a*) illustrates an example in which the QP 0 (710), the QP 1 (711), and the QP 2 (712) are requesters and the QP 3 (713), the QP 4 (714), and the QP 5 (715) are operating as responders. In FIG. 7(*a*), the data transfer control program 702 operating in the node 1 transfers the user data to the QP 3 (713) of the node 2 from the QP 0 (710) set to the service level 0, and then transfers the control data to the QP 4 (714) of the node 2 from the QP 1 (711) set to the service level 1.

The failure monitoring program 703 operating in the node 1 checks the states of the QP 0 (710) and the QP 1 (711). When an error of the QP 0 (710) or the QP 1 (711) is detected, the failure monitoring program 703 sends an error notification to the QP 5 (715) of the node 2 from the QP 2 (712) set to the service level 2. The data transfer control program 705 operating in the node 2 acquires the error notification from the Completion Queue connected to the QP 5 (715).

FIG. 7(*b*) illustrates an example in which the roles of the requesters and the responders are inverse to those in FIG. 7(*a*). In FIG. 7(*b*), the data transfer control program 704 operating in the node 2 transfers the user data to the QP 0 (710) of the node 1 from the QP 3 (713) set to the service level 0 and transfers the control data to the QP 1 (711) of the node 1 from the QP 4 (714) set to the service level 1.

The failure monitoring program 705 operating in the node 2 checks the states of the QP 3 (713) and the QP 4 (714). When an error of the QP 3 (713) or the QP 4 (714) is detected, the failure monitoring program 704 sends an error notification to the QP 2 (712) of the node 1 from the QP 5 (715) set to the service level 2. The data transfer control program 702 acquires the error notification from a Completion Queue connected to the QP 2 (712).

In FIG. 7, although one error notification QP is assigned to one user data transfer QP and one control data transfer QP, one error notification QP may be assigned to a plurality of user data transfer QPs or a plurality of control data transfer QPs. Due to the restriction of the IB standard, different processes cannot manipulate the same QP. Therefore, the data transfer control program 702 and the failure monitoring program 703 operate as a part of a storage control program operating as one process on the node 1 (700). The data transfer control program 704 and the failure monitoring program 705 of the node 2 (701) also operate as a part of a storage control program operating as one process on the node 2 (701). A configuration may be acceptable in which the storage control program is caused to operate as a plurality of processes and different QPs are manipulated for each process in each node.

Figure 9:
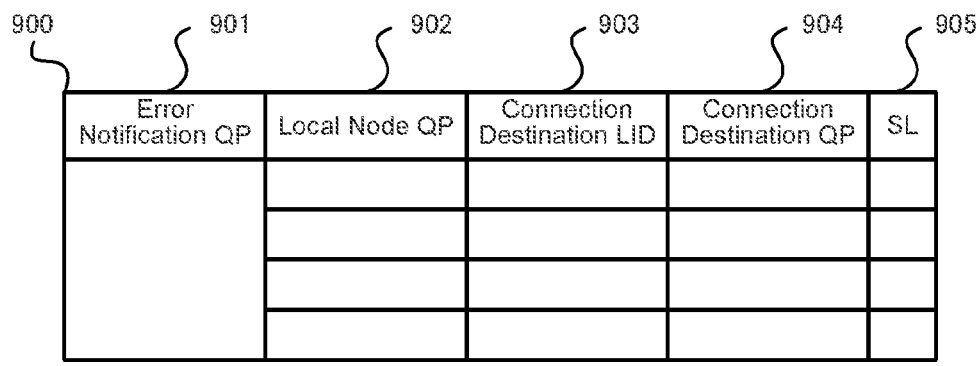
FIG. 9 is a view explaining a management table about QP information.

FIG. 9 is a view explaining the management table for the QP information in Example 1. Each storage node has a QP information management table 900. The data transfer control program receiving an error notification from a communication partner node executes failure processing referring to the QP information management table 900.

The QP information management table 900 stores an identification information 901 of an error notification QP and an identification information 902 of user data and control data transfer QPs in a node (Local node) storing the management table 900. The QP information management table 900 further stores an LID 903 of an IB port and an identification information 904 of a QP of a connection destination node (Remote node) and a service level (SL) 905 used for data transfer. Herein, the identification information of the QP is a QP number, for example.

The data transfer control program receiving the error notification can detect a QP causing an error and a node of the QP by comparing the QP identification information contained in the error notification with the identification information 904 of the QP of the connection destination node in the QP information management table 900. Moreover, the QP of the Local node to be destroyed, re-created, or reset can also be specified from the identification information 902 on the QP information management table 900.

Furthermore, the data transfer control program can set a service level designated in the service level 905 to the QP which is re-created or reset.

Figure 10:
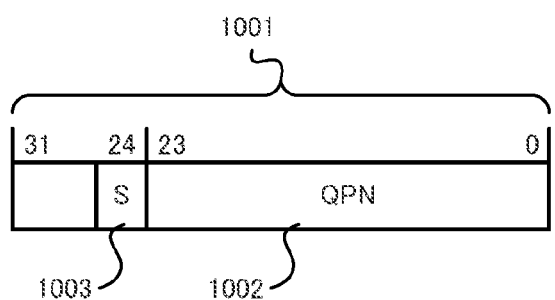
FIG. 10 is a view explaining data sent and received by an error notification QP.

FIG. 10 is a view explaining data to be sent and received between the error notification QPs. The failure monitoring program creates a request in which a 32 bit length data (1001) is stored in an Immediate Data in an RDMA Write with Immediate operation of IB, and then posts the request to the error notification QP, whereby the request is sent to a communication partner node (QP) using the error notification QP. A program (data transfer control program) executed in the node receiving the request can acquire the Immediate Data from a Completion Queue associated with the RQ of the error notification QP.

The Immediate Data (1001) stores a QP number (1002) of the QP causing an error and information (1003) identifying the state thereof. With respect to the request of the RDMA Write with Immediate operation sent by the failure monitoring program, data other than the Immediate Data is not transferred, and therefore the parameters of the request are set so that the data transfer length other than the Immediate Data is 0 and the number of Scatter Gather lists is also 0.

Although the details are described later, the error notification QP is not used only when sending information about a QP causing an error (a QP in Error state) and also used when sending information of a QP in another state. Therefore, the information (1003) identifying the state may store the states (Init, RTS, and the like) other than Error state. Not only the failure monitoring program but also the data transfer control program creates the data (1001) according to the format illustrated in FIG. 10 using the error notification QP, and then sends the same.

Figure 11:
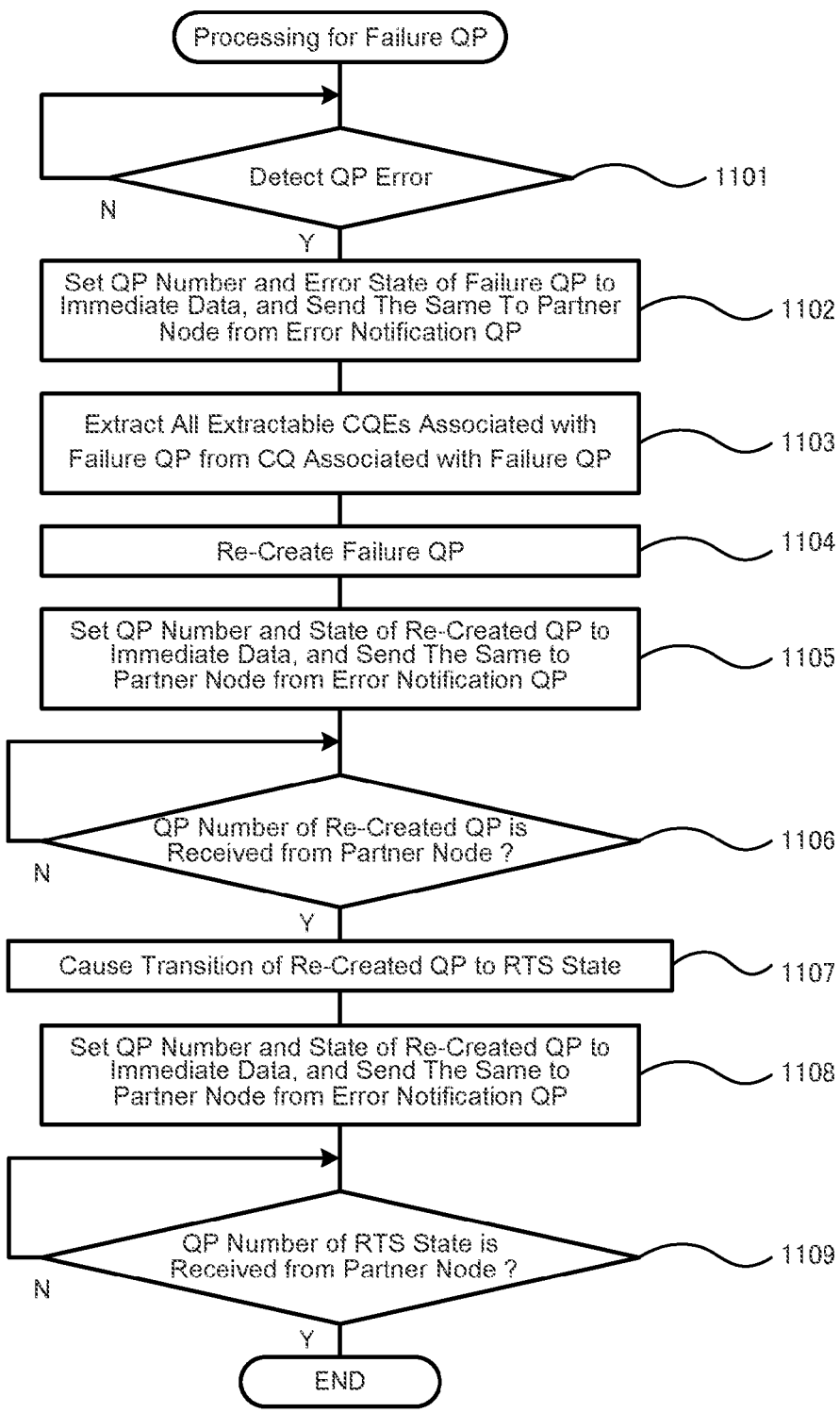
FIG. 11 is a view explaining processing for a failure QP in Example 1.
Figure 12:
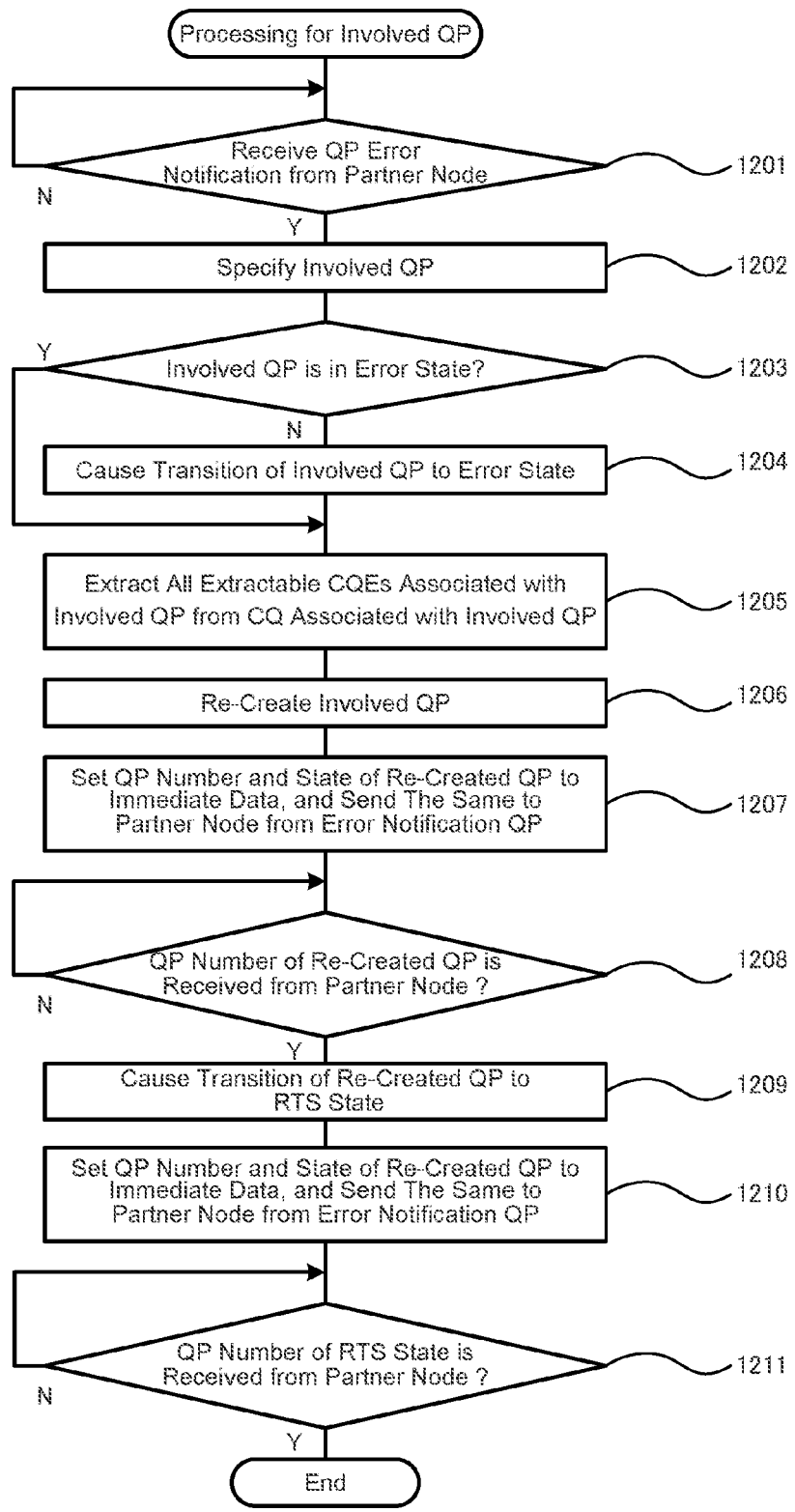
FIG. 12 is a view explaining processing for an involved QP in Example 1.

With reference to FIG. 11 and FIG. 12, the notification of a QP error using the error notification QP and a failure processing method to the notification are described. In Example 1, the occurrence of an error due to a software bug is avoided with respect to the error notification QP by limiting the use of the error notification QP only to processing relating to the error notification illustrated in FIG. 11 and FIG. 12. Hereinafter, a QP which has caused the transition to Error state without permission from a communication partner is referred to as a failure QP. A QP which is a communication partner of the failure QP and needs to execute failure processing with the failure QP is referred to as an involved QP.

FIG. 11 is a view explaining processing for the failure QP in Example 1. This flow is executed by the failure monitoring program operating in the node to which the failure QP belongs. On the other hand, FIG. 12 illustrates a flow of processing performed in the data transfer control program operating in the node to which the involved QP belongs.

The failure monitoring program waits until an error of the user data transfer QP or the control data transfer QP is detected (1101). The QP error is sometimes detected as a completion error of IB or sometimes notified as an asynchronous error.

The failure monitoring program detecting an error notifies the storage control program to change the data transfer handled by the failure QP to data transfer by an alternative QP assigned beforehand. The alternative QP may be a QP associated with an IB port of the same HCA as an HCA having an IB port with which the failure QP is associated, or may be a QP associated with an IB port of the other HCA. The storage control program executes the data transfer by the alternative QP in response to the notification.

Also, the failure monitoring program detecting an error displays information (LID, QP number, and the like) of the failure QP on the management terminal 102 to notify a storage administrator of the information.

Next, the failure monitoring program detecting the error sets information storing the QP number and the error state of the failure QP in the format illustrated in FIG. 10 to the Immediate Data in the RDMA Write with Immediate operation, and then sends the same to a partner node (i.e., node to which the involved QP belongs) from the error notification QP (1102).

Next, the failure monitoring program extracts a Completion Queue Entry (CQE) associated with the failure QP from a Completion Queue connected to the failure QP (1103). However, the Completion Queue Entry cannot be acquired depending on the cause of the error in some cases. In that case, this step 1103 is skipped.

Next, the failure monitoring program destroys the failure QP, and then creates a new QP (1104). The state of the QP re-created herein is Reset state. The failure monitoring program may successively cause the transition of the failure QP to Init state.

Next, the failure monitoring program creates a request in which the information which allows identification of the QP number and the state of the re-created QP is set to the Immediate Data in the RDMA Write with Immediate operation, and then sends the request to a partner node from the error notification QP (1105).

On the other hand, in a communication partner node, the data transfer control program recreates the involved QP in response to receiving the notification that was sent in Step 1102 by the failure monitoring program of a node to which the failure QP belongs. The failure monitoring program waits until the QP number of the QP re-created by the data transfer control program of the communication partner node is sent to the error notification QP (1106).

Next, the failure monitoring program causes the transition of the re-created QP to RTR state using the received QP number. The transition to RTR state from Init state requires the specification of the QP number of a communication partner. In addition thereto, the LID and a PSN (Packet Sequence Number) of the communication partner are also required. The LID does not change in the re-creation of the QP, and therefore the value before the re-creation is re-set and, with respect to the PSN, a predetermined initial value is set. Successively, the failure monitoring program causes the transition of the re-created QP to RTS state (1107). Then, the failure monitoring program creates a request in which the QP number and the state of the re-created QP are set to the Immediate Data in the RDMA Write with Immediate operation, and then sends the request to the partner node from the error notification QP (1108).

In parallel with the processing so far, the data transfer control program of the communication partner node executes processing of causing the transition of the involved QP to RTS state in the communication partner node. The failure monitoring program waits until the QP number and the state of the QP (involved QP) whose state has been changed to RTS state by the data transfer control program of the communication partner node is sent to the error notification QP (1109).

When receiving the QP number and the state of the involved QP and confirming that the involved QP has caused the transition to RTS state, the failure monitoring program displays the information (LID, QP number, and the like) of the QP on the management terminal 102 to notify the storage administrator of the information. Moreover, the failure monitoring program notifies the data transfer control program of the own node that the data transfer using the re-created QP has been enabled, and then ends the processing. The data transfer control program of the own node receives the notification to thereby judge that the data transfer using the re-created QP has been enabled.

FIG. 12 is a view explaining processing for an involved QP in Example 1. This flow is executed by the data transfer control program operating in the node to which the involved QP belongs.

The data transfer control program waits for the notification of an error from a communication partner node (1201).

The data transfer control program receiving error notification specifies an involved QP referring to the QP information contained in the Immediate Data and the QP information management table 900 (1202). As described above, the QP information contained in the Immediate Data includes the QP number of the failure QP. The data transfer control program receiving the error notification specifies a row in which the identification information 904 of the QP of the connection destination node matches with the QP number of the failure QP referring to each row in the QP information management table 900. Then, by specifying the identification information 902 of the QP in the row, the involved QP can be specified.

Then, the data transfer program notifies the storage control program to change the data transfer handled by the involved QP to data transfer by an alternative QP assigned beforehand. The alternative QP may be a QP associated with an IB port of the same HCA as an HCA having an IB port with which the involved QP is associated, or may be a QP associated with an IB port of the other HCA. The storage control program executes the data transfer by the alternative QP in response to the notification.

Next, the data transfer control program checks whether the involved QP is already in Error state (1203). When the involved QP is not in Error state, the data transfer control program causes the transition of the involved QP to Error state (1204). When a Queue Pair causes the transition to Error state, the request stored in a Send Queue and a Receive Queue of the Queue Pair is output to a Completion Queue. Depending on the cause of the error, NAK is returned to a requester from a responder, and then a requester side QP receiving NAK sometimes causes the transition to Error state. In that case, Step 1204 is skipped.

Moreover, the data transfer control program displays the information (LID, QP number, and the like) of the involved QP which has caused the transition to Error state on the management terminal 102 to notify the storage administrator of the information.

Next, the data transfer control program extracts a Completion Queue Entry (CQE) associated with the involved QP from the Completion Queue connected to the involved QP (1205). However, the Completion Queue Entry cannot be acquired depending on the cause of the error in some cases. In that case, this step 1205 is skipped.

Next, the data transfer control program destroys the involved QP, and then creates a new QP (1206). The state of the QP re-created herein is Reset state. The data transfer control program may successively cause the transition of the involved QP to Init state.

Next, the data transfer control program creates a request in which the information which allows identification of the QP number and the state of the re-created QP is set to the Immediate Data in the RDMA Write with Immediate operation, and then sends the request to a partner node from the error notification QP (1207).

In parallel with the processing so far, the failure monitoring program in the communication partner node (node to which the failure QP belongs) recreates a failure QP. The data transfer control program waits until the QP number of the QP re-created by the failure monitoring program of the communication partner node is sent to the error notification QP (1208).

Next, the data transfer control program causes the transition of the re-created QP to RTR state using the received QP number. The transition from Init state to RTR state also requires the LID and the PSN (Packet Sequence Number) of a communication partner in addition to the QP number of the communication partner. The LID does not change in the re-creation of the QP, and therefore the value before the re-creation is re-set and, with respect to the PSN, a predetermined initial value is set. Successively, the data transfer control program causes the transition of the re-created QP to RTS state (1209). Then, the data transfer control program sets the QP number and the state of the re-created QP to the Immediate Data in the RDMA Write with Immediate operation, and then sends a request to the partner node from the error notification QP (1210).

In parallel with the processing so far, the failure monitoring program in the communication partner node executes processing of causing the transition of the failure QP to RTS state. The data transfer control program waits until the QP number and the state of the QP whose state has been changed to RTS state by the failure monitoring program of the communication partner node is sent to the error notification QP (1211).

When receiving the QP number and the state of the QP re-created by the communication partner node and confirming that the QP has caused the transition to RTS state, the data transfer control program judges that the data transfer using the re-created QP is enabled. Then, the data transfer control program displays the information (including LID, QP number, and the like) of the QP which has caused the transition to RTS state to be able to perform data transfer on the management terminal 102 to notify the storage administrator of the information, and then ends the processing. When the processing of FIG. 11 and FIG. 12 is completed, the QPs of the nodes on both ends enter RTS state, so that data transfer can be resumed.

FIG. 13 is a view explaining the communication between the error notification QPs in Example 1. First, the failure monitoring program operating in the node 2 detects an error of a data transfer QP for user data transfer or for control data transfer (1301). Next, the failure monitoring program operating in the node 2 sends an RDMA Write with Immediate request storing the QP number and the state identification information of the QP causing the error in the Immediate Data to the error notification QP 2 (712) of the node 1 from the error notification QP 5 (715) (1302). The processing corresponds to the processing of Steps 1101 and 1102 in FIG. 11.

The failure monitoring program operating in the node 2 sending the error notification destroys the QP causing the error, i.e., failure QP, and then re-creates a QP (1303). The processing corresponds to the processing of Steps 1103 and 1104 in FIG. 11.

The data transfer control program operating in the node 1 receiving the error notification specifies a QP corresponding to the failure QP, i.e., involved QP, from the contents of the Immediate Data notified in 1302, destroys the same, and then re-creates a QP (1304). The processing corresponds to the processing of Steps 1201 to 1206 in FIG. 12.

Then, the failure monitoring program of the node 2 and the data transfer control program of the node 1 send and receive the RDMA Write with Immediate request storing the QP number and the state identification information of the re-created QP in the Immediate Data (1305, 1306). The processing corresponds to the processing of Step 1105 in FIG. 11 and Step 1207 in FIG. 12.

Next, the failure monitoring program of the node 2 and the data transfer control program of the node 1 cause the transition of the re-created QP to RTS state in the order of Reset state, Init state, and then RTR state (1307, 1308). The processing corresponds to the processing of Steps 1106 to 1107 in FIG. 11 and Steps 1208 to 1209 in FIG. 12.

Finally, the failure monitoring program of the node 2 and the data transfer control program of the node 1 send and receive the RDMA Write with Immediate request storing the QP number and the state identification information of the QP in which the transition of the state to RTS state is completed in the Immediate Data (1309, 1310). The processing corresponds to the processing of Steps 1108 to 1109 in FIG. 11 and Steps 1210 to 1211 in FIG. 12. When the processing described above is completed, data transfer can be resumed between the node 1 and the node 2 using the re-created QP. The data transfer using the re-created QP may be immediately performed but, when the data transfer by an alternative QP is performed, the data transfer by the alternative QP may be continuously carried out (i.e., it is not necessary to immediately perform the data transfer using the re-created QP). When the alternative QP has caused the transition to Error state, the data transfer using the re-created QP may be performed.

FIG. 14 is a view in which the type of a failure and a method for detecting and notifying the same in the storage internal network of Example 1 are compared with standard one in the IB standard. The types of failures assumed in the storage internal network to which the IB is applied include a physical error of a port, an intermittent error, and an error due to a software bug (1401).

The physical error of a port is a failure in which the IB link is down, so that the communication between the physical ports is disabled, for example. In the case of this failure, according to the IB standard, the failure is detected by a Subnet Manager Agent, and then is notified to the Subnet Manager or detected in an asynchronous event generated by the HCA. Also in this example, with respect to the port physical error, the failure is notified to the Subnet Manager according to the IB standard. Then, the storage control program receiving the failure occurrence notification from the Subnet Manager performs failover processing of a data transfer path. Alternatively, the storage control program detecting the asynchronous event generated by the HCA performs failover processing of a data transfer path.

The intermittent error is a failure, such as an intermittent packet loss. In the case of this failure, according to the IB standard, a receive side QP detects the discontinuity of the sequence number added to each packet, and then requests the resending to a sending side QP. Also in this example, with respect to the intermittent error, processing according to the IB standard is performed.

According to the IB standard, when a QP causes the transition to Error state without permission from a communication partner due to a software bug or the like, a sending source QP outputs a Local ACK Timeout error, whereby a node detects a sending destination QP error as described above with reference to FIG. 6. According to the method, it takes time until the Local ACK Timeout error is output, and therefore it takes a long time to detect an error of a QP.

In contrast thereto, when an error occurs in a data transfer QP, the failure monitoring program notifies a communication partner through the error notification QP in the storage device 100 of Example 1. Thus, the storage device 100 can execute failure processing before the Local ACK Timeout. As described above, the present invention can provide a method for detecting an error of a logical port of a communication partner due to a software bug without depending on the timeout of a request sending source logical port in a storage device having a plurality of storage nodes which is interconnected through a storage internal network. As a result, even when an error of a logical port due to a software bug occurs, the storage nodes can perform switching so that data transfer using an alternative logical port (alternative QP) is immediately performed, so that the occurrence of the timeout in a host system can be avoided.

Example 2

Figure 15:
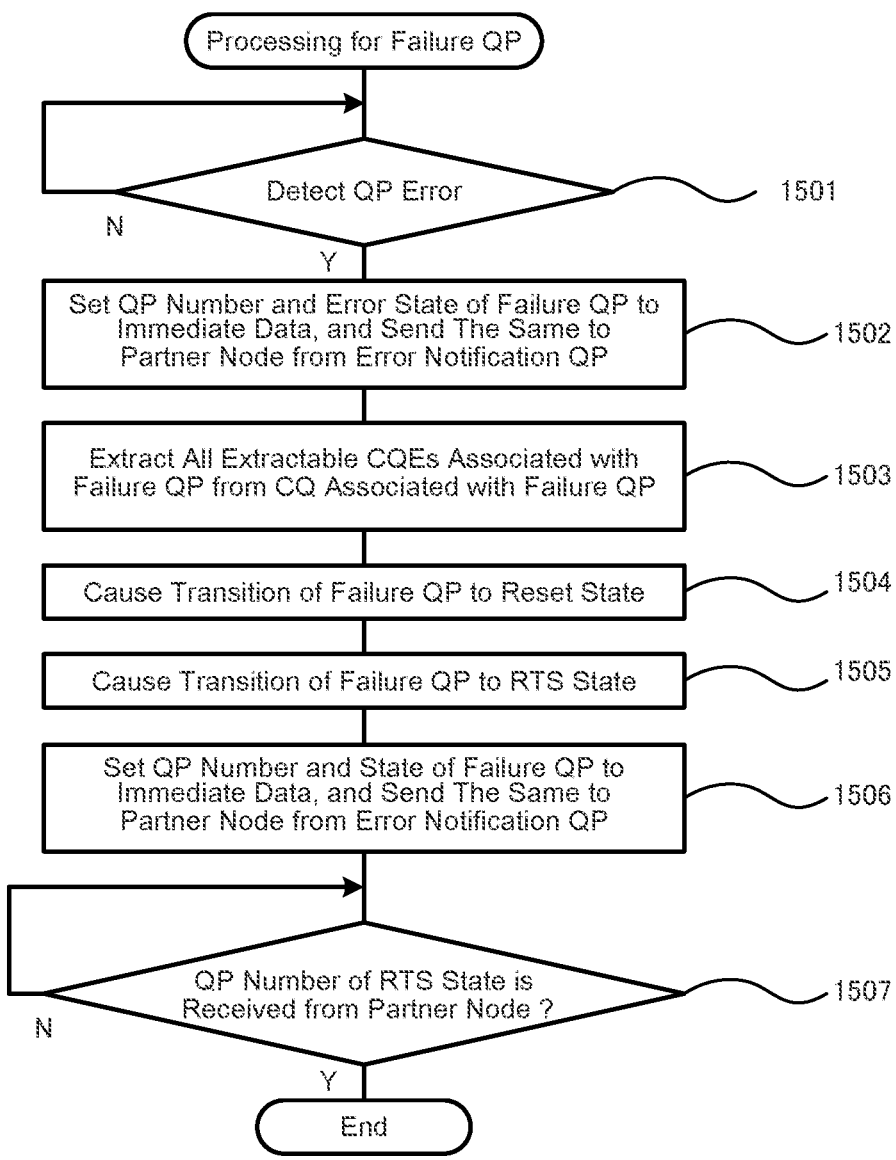
FIG. 15 is a view explaining processing to a failure QP in Example 2.
Figure 16:
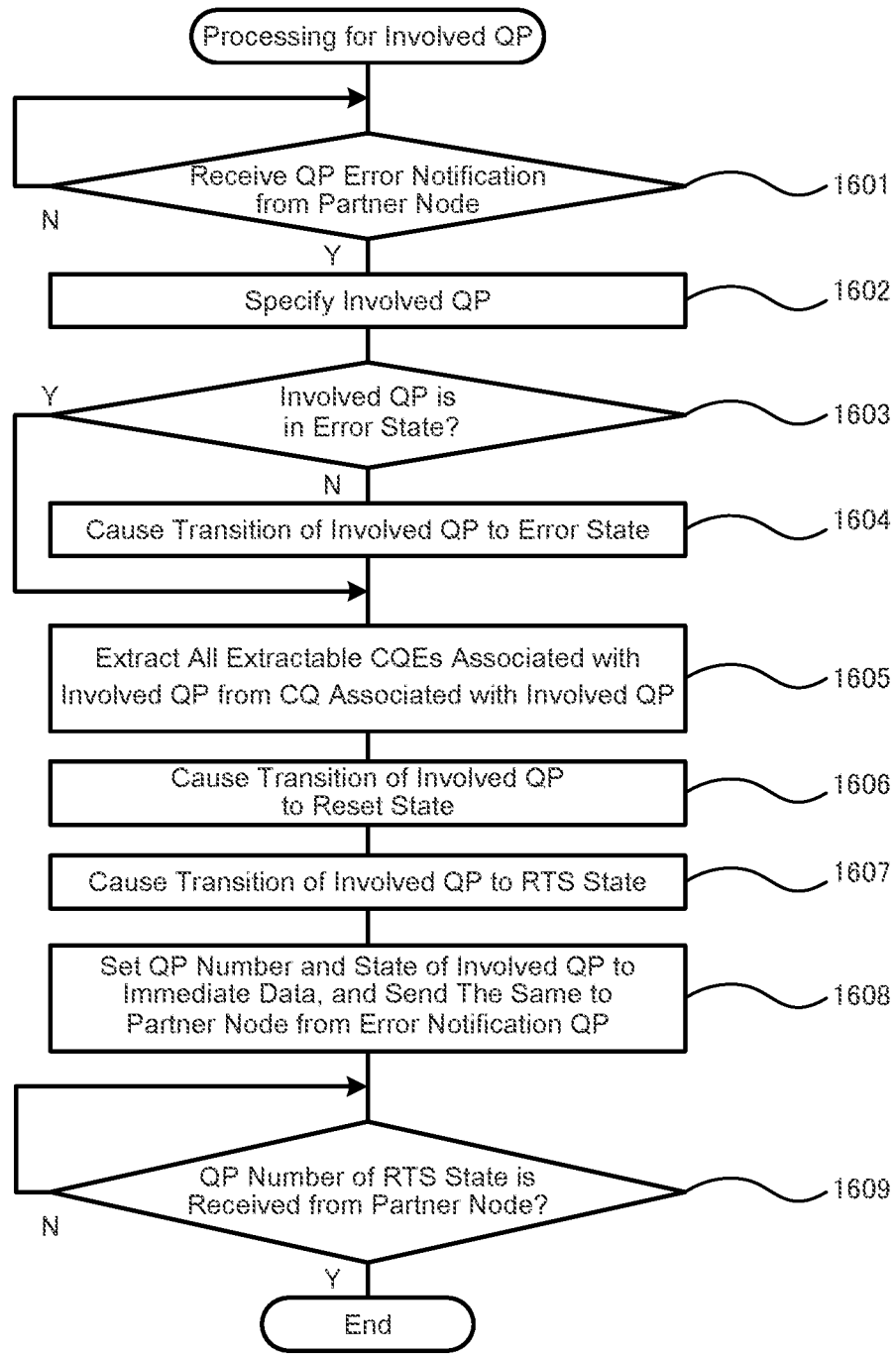
FIG. 16 is a view explaining processing to an involved QP in Example 2.
Figure 17:
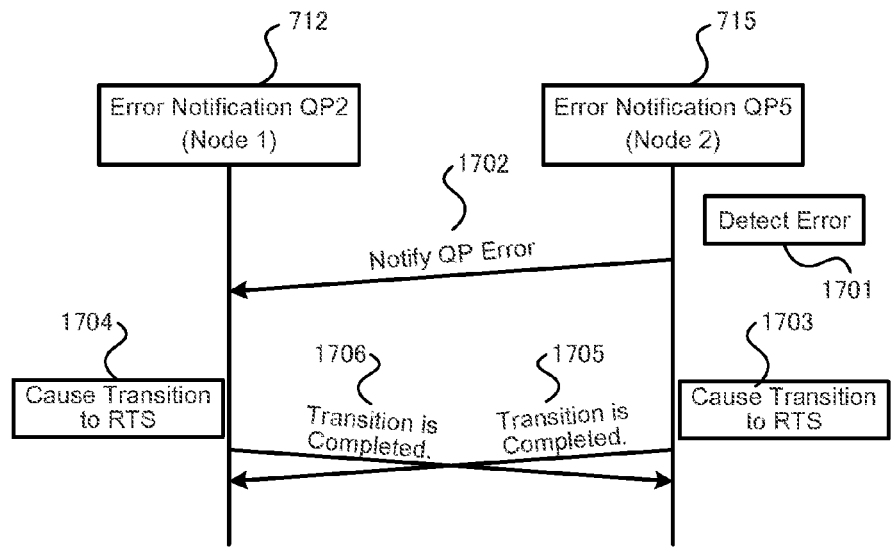
FIG. 17 is a view explaining communication between error notification QPs in Example 2.

With reference to FIG. 15 to FIG. 17, Example 2 is described. First, the outline of Example 2 is described. A storage device of Example 2 is different from the storage device of Example 1 in processing for a failure QP and processing for an involved QP. The other configurations and operations of the storage device are the same as those of the storage device of Example 1. In the storage device of Example 2, a failure QP and an involved QP are reset and reused without destroying.

With reference to FIG. 15 and FIG. 16, the notification of a QP error using an error notification QP and a failure processing method to the notification in the storage device of Example 2 are described. In the same manner as in Example 1, a QP which has caused the transition to Error state without permission from a communication partner is referred to as a failure QP. A QP which is a communication partner of the failure QP and needs to execute failure processing with the failure QP is referred to as an involved QP.

FIG. 15 is a view explaining processing to the failure QP in Example 2. This flow is executed by a failure monitoring program operating in a node to which the failure QP belongs.

Since the processing of Step 1501 to Step 1503 has the same contents as the contents of the processing of Steps 1101 to 1103 in FIG. 11 in Example 1, a description thereof is omitted.

The failure monitoring program extracting a Completion Queue Entry (CQE) from a Completion Queue in Step 1503 causes the transition of the failure QP to Reset state (1504). In Example 2, the failure QP is not destroyed, and therefore the QP number of the failure QP does not change. Therefore, the processing of Step 1105 in FIG. 11 notifying the QP number of Example 1 is unnecessary in Example 2. The failure monitoring program may successively cause the transition of the failure QP to Init state.

Since the processing of Step 1505 to Step 1507 has the same contents as the contents of the processing of Steps 1107 to 1109 in FIG. 11 in Example 1, a description thereof is omitted.

FIG. 16 is a view explaining processing to the involved QP in Example 2. This flow is executed by a data transfer control program operating in a node to which the involved QP belongs, similar to Example 1.

Since the processing of Step 1601 to Step 1605 has the same contents as the contents of the processing of Steps 1201 to 1205 in FIG. 12 in Example 1, a description thereof is omitted.

The data transfer control program extracting a Completion Queue Entry (CQE) from a Completion Queue in Step 1605 causes the transition of the involved QP to Reset state (1606). In Example 2, the involved QP is not destroyed, and therefore the QP number of the involved QP does not change. Therefore, the processing of Step 1207 in FIG. 12 notifying the QP number of Example 1 is unnecessary in Example 2. The data transfer program may successively cause the transition of the involved QP to Init state.

Since the processing of Step 1607 to Step 1609 has the same contents as the contents of the processing of Steps 1209 to 1211 in FIG. 12 in Example 1, a description thereof is omitted.

When the processing of FIG. 15 and FIG. 16 is completed, the QPs of the nodes on both ends enter RTS state, so that data transfer can be resumed.

FIG. 17 is a view explaining the communication between the error notification QPs in Example 2. First, the failure monitoring program operating in the node 2 detects an error in a data transfer QP (1701). Next, the failure monitoring program operating in the node 2 sends an RDMA Write with Immediate request storing the QP number and the state identification information of the QP causing the error in the Immediate Data to the error notification QP 2 (712) of the node 1 from the error notification QP 5 (715) (1702). The failure monitoring program operating in the node 2 sending the error notification causes the transition of the QP causing the error, i.e., the failure QP, in the order of Error state, Reset state, Init state, RTR state, and RTS state (1703).

The data transfer control program operating in the node 1 receiving the error notification specifies a QP corresponding to the failure QP, i.e., involved QP, from the contents of the Immediate Data notified in 1702. Then, the transition of the involved QP is caused in the order of Error state, Reset state, Init state, RTR state, and RTS state (1704). Finally, the failure monitoring program of the node 2 and the data transfer control program of the node 1 send and receive the RDMA Write with Immediate request storing the QP number and the state identification information of the QP in which the transition of the state to RTS state is completed in the Immediate Data (1705, 1706). Thus, data transfer can be resumed between the node 1 and the node 2. In the storage device according to Example 2, the re-creation of a QP is not performed, and therefore the notification of the QP number (1305, 1306 in FIG. 13) performed in Example 1 is unnecessary. Therefore, the time to the resumption of data transfer can be shortened.

Example 3

Figure 18:
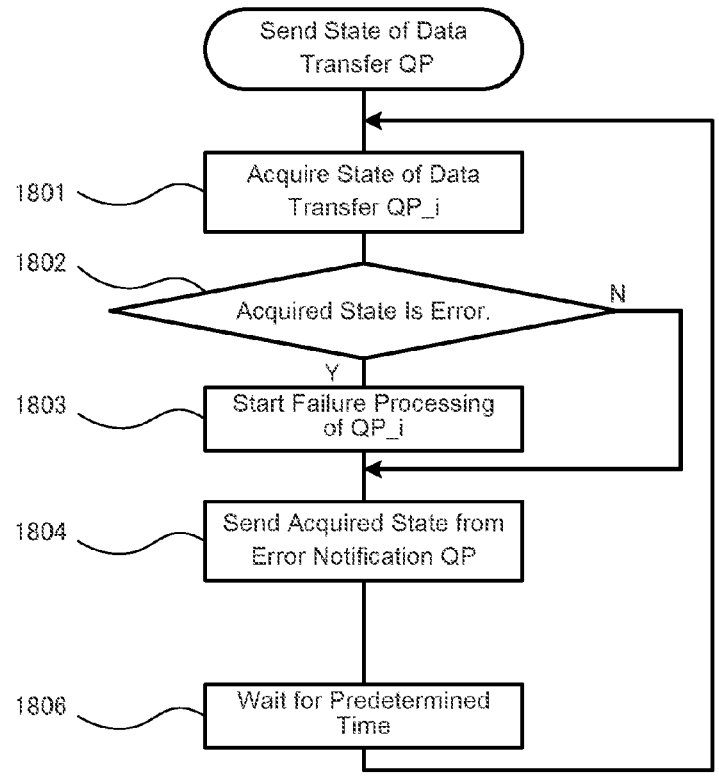
FIG. 18 is a view explaining communication between error notification QPs in Example 3.
Figure 19:
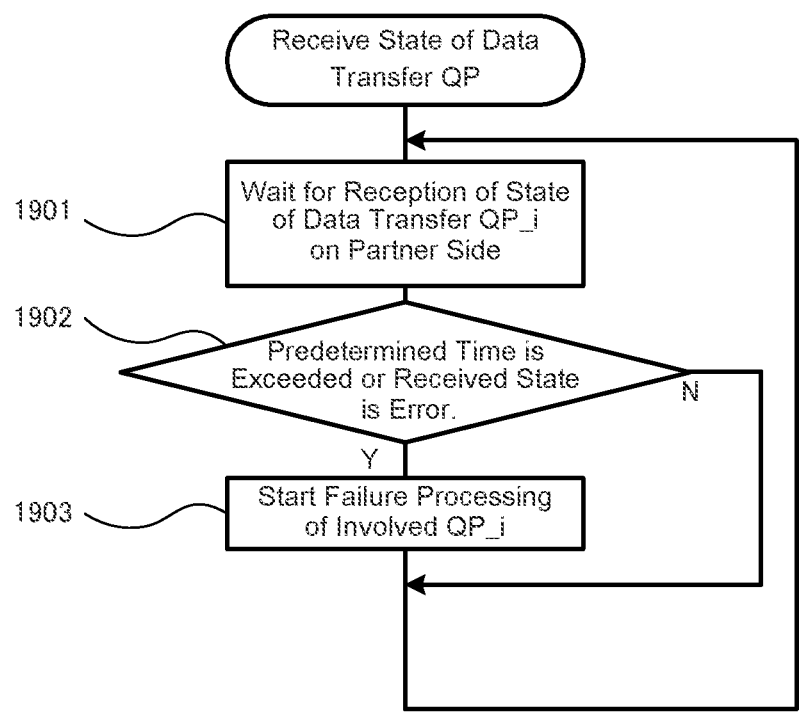
FIG. 19 is a view explaining the communication between the error notification QPs in Example 3.

With reference to FIG. 18 and FIG. 19, a storage device of Example 3 of the present invention is described. First, the outline of Example 3 is described. The storage device of Example 3 is different from the storage device of Example 1 or Example 2 in a QP error detection method. The storage device of Example 1 or Example 2 detects an error of a data transfer QP by acquiring of a completion showing an error or receiving of an asynchronous error by the failure monitoring program. In contrast thereto, the storage device of Example 3 performs heartbeat communication with error notification QPs in order to detect an error of the data transfer QP.

FIG. 18 is a view explaining sending processing of the heartbeat communication in Example 3. By this flow, each storage node acquires the state of a data transfer QP, and then sends the same from the error notification QP. The format of the send data is as illustrated in FIG. 10 and is sent as the Immediate Data of the RDMA Write with Immediate operation in the same manner as in Example 1 or Example 2.

When the node has N data transfer QPs, the storage node executes a heartbeat sending program for each data transfer QP. The heartbeat sending program operates as a part of a storage control program operating as one process on each node as with the data transfer control program or the failure monitoring program. Hereinafter, an example is described in which the heartbeat sending program performs heartbeat sending to a specific QP (which is referred to as a QP_i) among the N data transfer QPs.

First, the heartbeat sending program operating in each storage node acquires the state of the data transfer QP_i (1801). The state of the QP_i can be acquired by using ibv_query_qp( ) of the Verbs API, for example.

Next, the heartbeat sending program proceeds the processing to Step 1803 when the data transfer QP, the state of which is acquired, is an error and, otherwise, to Step 1804.

Next, the heartbeat sending program starts failure processing to the QP_i in Error state (1803). The failure processing started herein is the same as the processing of FIG. 11 or FIG. 15. Then, the heartbeat sending program proceeds the processing to Step 1804.

Next, the heartbeat sending program sends the acquired state as the Immediate Data of the RDMA Write with Immediate operation from the error notification QP (1804).

Thereafter, the heartbeat sending program waits for a predetermined time (1806). The time is set so that the influence given to the storage device by the heartbeat sending/receiving processing is sufficiently small and the influence given to the storage device operation by the time from the occurrence to the detection of a failure is also sufficiently small.

The heartbeat sending program repeats the processing of Step 1801 to Step 1806.

FIG. 19 is a view explaining receiving processing of the heartbeat communication in Example 3. The receiving processing of the heartbeat communication is executed by a heartbeat receiving program. According to this flow, each storage node receives the state of a data transfer QP of a communication partner, and judges the necessity of starting the failure processing to an involved QP according to the contents. As with the heartbeat sending program, when the node has N data transfer QPs, the storage node executes the heartbeat receiving program for each data transfer QP. The heartbeat receiving program also operates as a part of the storage control program operating as one process on each node as with the heartbeat sending program.

Hereinafter, the flow of the processing is described about the heartbeat receiving program receiving the state of a specific QP (which is referred to as QP_i) among the plurality of data transfer QPs of a communication partner node as with the description of FIG. 18. First, the heartbeat receiving program operating in each storage node waits for the reception of the state of the data transfer QP_i of the node of the communication partner, which the heartbeat sending program operating in the communication partner node sends, through the error notification QP (1901).

When the received state of the data transfer QP_i of the node of the communication partner is Error or the state cannot be received within a predetermined time, the heartbeat receiving program proceeds the processing to Step 1903. Otherwise, the processing is repeated from Step 1901.

In Step 1903, the heartbeat receiving program specifies an involved QP_i, and then starts failure processing to the involved QP_i. The failure processing started herein is the same as the processing of FIG. 12 or FIG. 16.

The heartbeat receiving program repeats the processing of Step 1901 to Step 1903.

As described above, also when the heartbeat communication is performed between the error notification QPs of each node, a QP error occurring in the data transfer QP of a communication partner node can be detected, and then failure processing for a failure QP and an involved QP can be started.

Example 4

Figure 20:
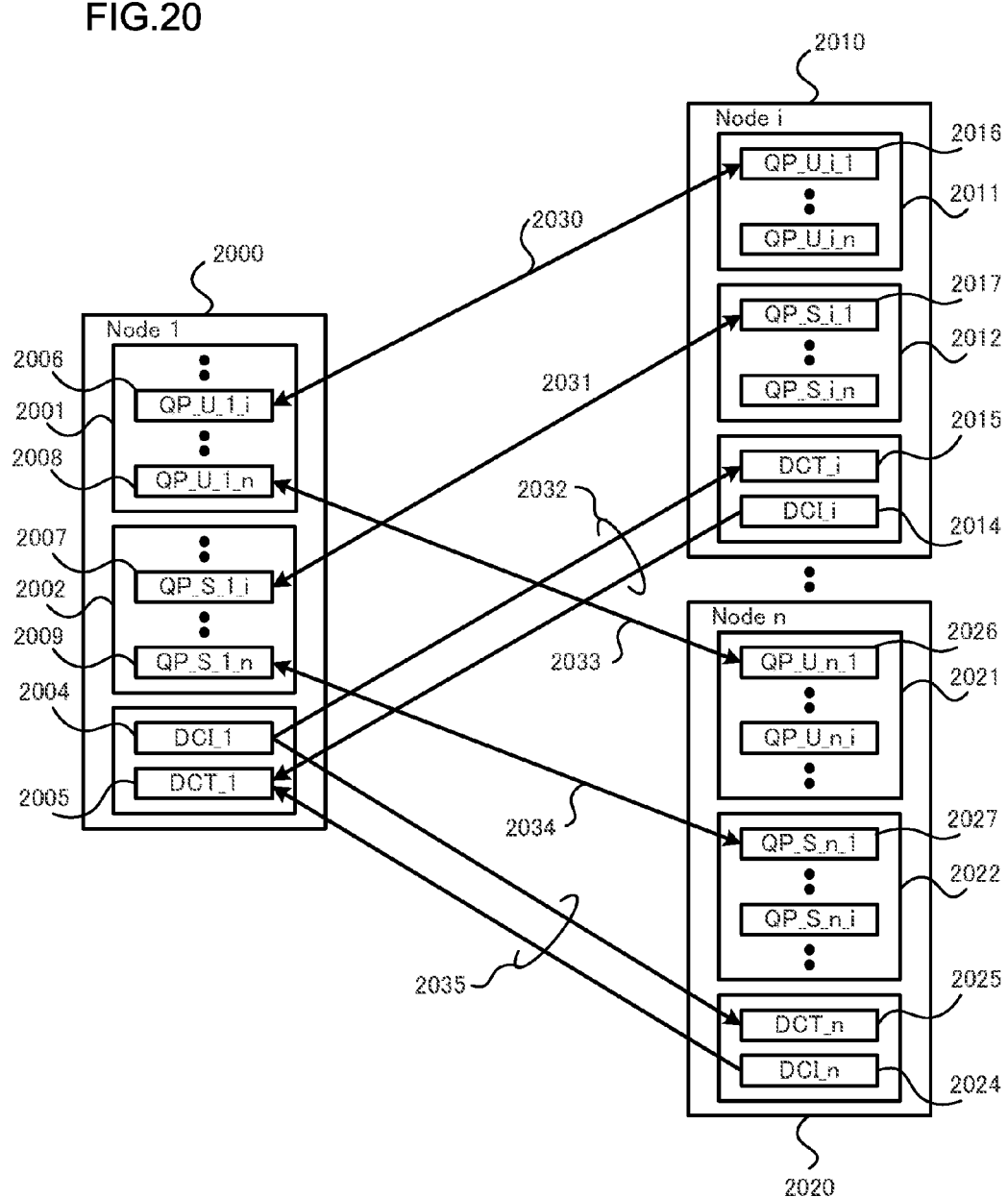
FIG. 20 is a view explaining logical connection among storage nodes in Example 4.
Figure 21:
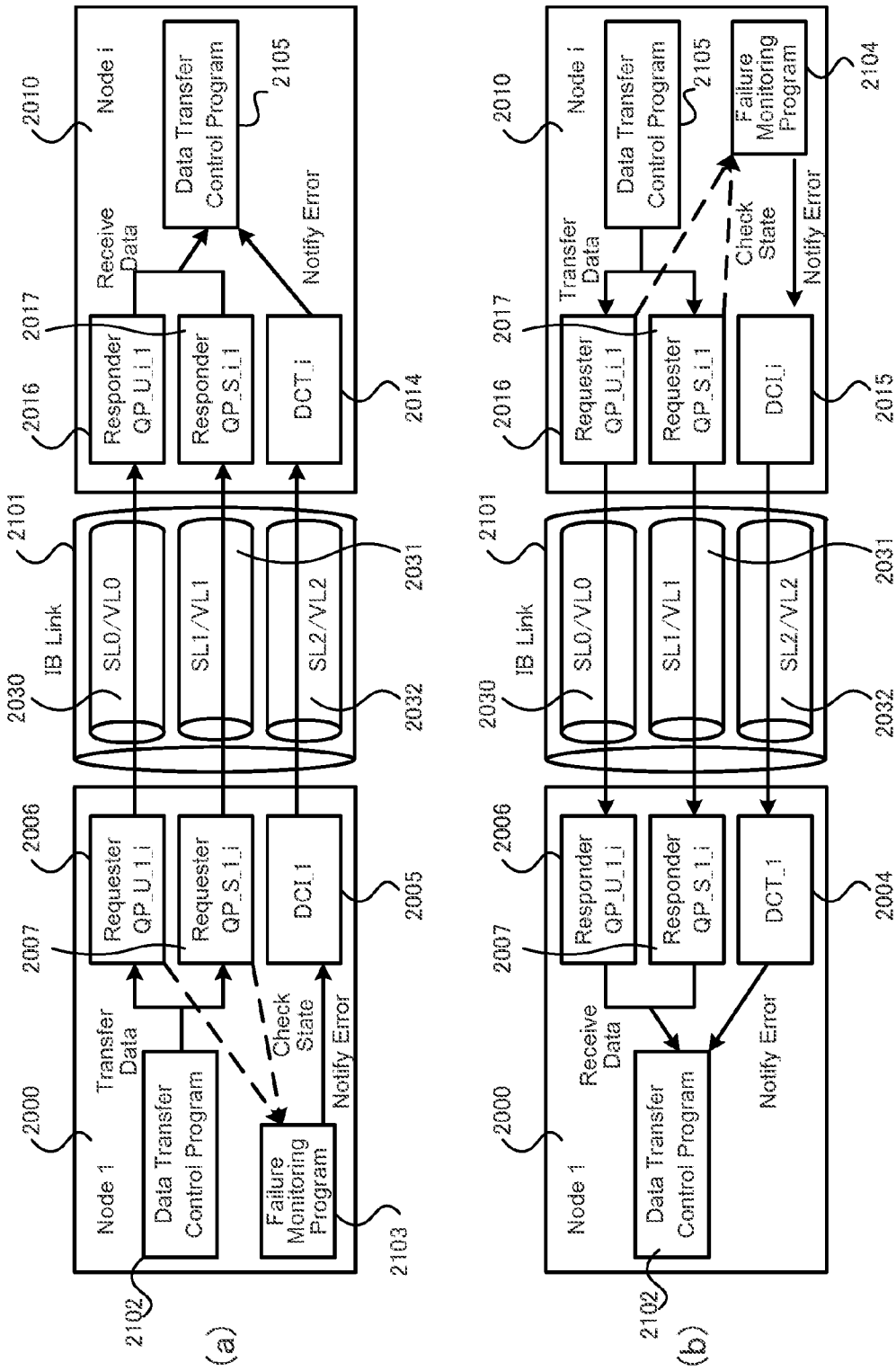
FIG. 21 are views explaining a QP error detection method in Example 4.

With reference to FIG. 20 and FIG. 21, a storage device of Example 4 of the present invention is described. In reliable data transfer service of IB (RC service), QPs are required to be connected in a one-to-one relationship for each process using the QPs and for each node serving as a communication partner. More specifically, when the number of the connection nodes is larger, a larger number of QPs are required to be created, which results in an increase in the resources consumed by the QPs (memory consumption amount and the like). According to the Dynamically Connected Transport (hereinafter abbreviated as DC) supported by the latest HCA, one-to-many QP connection can be achieved also in the RC service. The details of the DC are disclosed in Patent Document 2, for example. Hereinafter, a QP compatible with DC serving as a requester is referred to as a DC initiator and a QP compatible with DC serving as a responder is referred to as a DC target.

While common (not compatible with DC) QPs can perform data transfer by bi-directionally sending a request between two QPs, the QP compatible with DC can send a request only in a direction from the DC initiator to the DC target. Moreover, in the common QPs, the service level is set to the QPs in the transition of the state from Init state to RTR state. In contrast thereto, in the DC, when a request is posted to the DC initiator, the service level to be used is set for each request. In Example 4, by applying the DC to the error notification QPs, the QP resource required for the error notification decreases. As a result, as compared with the case where, when the number of nodes is n, the common QPs are used for all the nodes, the memory resource required for the error notification QPs can be reduced to 2/n.

FIG. 20 is a view explaining the logical connection between the storage nodes in Example 4.

In FIG. 20, a DCI_1 (2004), a DCI_i (2014), and a DCI_n (2024) are DC initiators. A DCT_1 (2005), a DCT_i (2015), and a DCT_n (2025) are DC targets.

A node 1 (2000) has n QPs containing a QP_U_1_i (2006) and a QP_U_1_n (2008) in order to send and receive data of a user data region 2001. Moreover, the node 1 (2000) has n QPs containing a QP_S_1_i (2007) and a QP_S_1_n (2009) in order to send and receive data of a control memory region 2002. The node 1 further has the DCI_1 (2004) for error notification sending and the DCT_1 (2005) for error notification reception.

FIG. 20 illustrates the connection relationship between the node 1 and the node i and between the node 1 and the node n among the interconnections of the n storage nodes. The connection relationship between the other nodes which are not illustrated is also the same.

A node i (2010) has n QPs containing a QP_U_i_1 (2016) in order to send and receive data of a user data region 2011. Moreover, the node i (2010) has n QPs containing a QP_S_i_1 (2017) in order to send and receive data of a control memory region 2012. The node i further has the DCI_i (2014) for error notification sending and the DCT_i (2015) for error notification reception.

A node n (2020) has n QPs containing a QP_U_n_1 (2026) in order to send and receive data of a user data region 2021. Moreover, the node n (2020) has n QPs containing a QP_S_n_1 (2027) in order to send and receive data of a control memory region 2022. The node n further has the DCI_n (2024) for error notification sending and the DCT_n (2025) for error notification reception.

The QP_U_1_i (2006) of the node 1 (2000) and the QP_U_i_1 (2016) of the node i (2010) send and receive user data through a virtual lane 2030. The QP_S_1_i (2007) of the node 1 (2000) and the QP_S_i_1 (2017) of the node i (2010) send and receive control data through a virtual lane 2031.

The QP_U_1_n (2008) of the node 1 (2000) and the QP_U_n_1 (2026) of the node n (2020) send and receive user data through a virtual lane 2033. The QP_S_1_n (2009) of the node 1 (2000) and the QP_S_n_1 (2027) of the node n (2020) send and receive control data through a virtual lane 2034.

The DCI_1 (2004) of the node 1 (2000) can send an error notification to the DCT_i (2015) of the node i (2010) through a virtual lane 2032 and to the DCT_n (2025) of the node n (2020) through a virtual lane 2035. The DCT_1 (2005) of the node 1 (2000) can receive an error notification from the DCI_i (2014) of the node i (2010) through the virtual lane 2032 and from the DCI_n (2024) of the node n (2020) through the virtual lane 2035.

FIG. 21 are views explaining a QP error detection method in Example 4. FIG. 21(a) illustrates a case where data is transferred from the node 1 (2000) to the node i (2010). FIG. 21(b) illustrates a case where data is transferred from the node i (2010) to the node 1 (2000). In FIG. 21(a) and FIG. 21(b), the node 1 (2000) has the QP_U_1_i (2006) for user data transfer, the QP_S_1_i (2007) for control data transfer, the DCI_1 (2005) for error notification sending, and the DCT_1 (2004) for error notification reception. Similarly, the node i (2010) has the QP_U_i_1 (2016) for user data transfer, the QP_S_i_1 (2017) for control data transfer, the DCI_i (2015) for error notification sending, and the DCT_i (2014) for error notification reception. The node 1 (2000) and the node i (2010) are connected by an IB link 2101 having the three virtual lanes 2030, 2031, and 2032.

In FIG. 21(a), the QP_U_1_i (2006), the QP_S_1_i (2007), and the DCI_1 (2005) are the requesters and the QP_U_i_1 (2016), the QP_S_i_1 (2017), and the DCT_i (2014) are the responders. In FIG. 21(a), a data transfer control program 2102 operating in the node 1 (2000) transfers user data to the QP_U_i_1 (2016) of the node i (2010) from the QP_U_1_i (2006) set to the service level 0 and transfers control data to the QP_S_i_1 (2017) of the node i (2010) from the QP_S_1_i (2007) set to the service level 1. A failure monitoring program 2103 operating in the node 1 (2000) checks the states of the QP_U_1_i (2006) and the QP_S_1_i (2007). When an error of the QP_U_1_i (2006) or the QP_S_1_i (2007) is detected, the failure monitoring program 2103 sends an error notification by sending a request set to the service level 2 from the DCI_1 (2005) to the DCT_i (2014) of the node i (2010). A data transfer control program 2105 acquires the error notification from a Completion Queue connected to the DCT_i (2014).

In FIG. 21(b), the QP_U_i_1 (2016), the QP_S_i_1 (2017), and the DCI_i (2015) are the requesters and the QP_U_1_i (2006), the QP_S_1_i (2007), and the DCT_1 (2004) are the responders. In FIG. 21(b), the data transfer control program 2105 operating in the node i (2010) transfers user data to the QP_U_1_i (2006) of the node 1 (2000) from the QP_U_i_1 (2016) set to the service level 0 and transfers control data to the QP_S_1_i (2007) of the node 1 (2000) from the QP_S_i_1 (2017) set to the service level 1. A failure monitoring program 2104 operating in the node i (2010) checks the states of the QP_U_i_1 (2016) and the QP_S_i_1 (2017). When an error of the QP_U_i_1 (2016) or the QP_S_i_1 (2017) is detected, the failure monitoring program 2104 sends an error notification by sending a request set to the service level 2 from the DCI_i (2015) to the DCT_1 (2004) of the node 1 (2000). The data transfer control program 2102 acquires the error notification from a Completion Queue connected to the DCT_1 (2004).

Processing to be executed by the failure monitoring program and the data transfer control program for a failure QP and an involved QP is the same as the processing described in Example 1 to Example 3. More specifically, the processing described in FIG. 11 and FIG. 12, or the processing described in FIG. 15 and FIG. 16, or the like is performed.

Example 5

Figure 22:
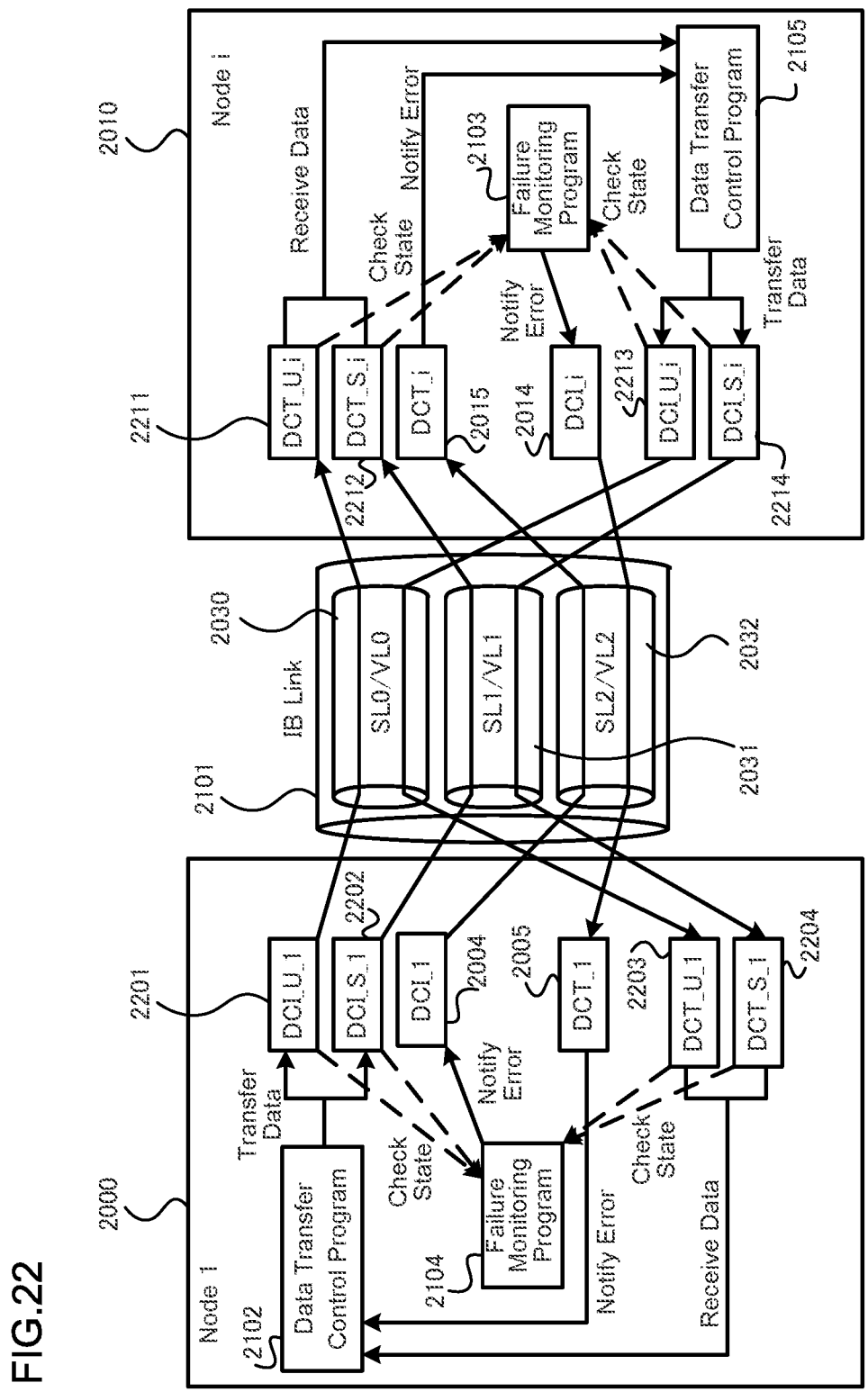
FIG. 22 is a view explaining a QP error detection method in Example 5.

With reference to FIG. 22, a storage device of Example 5 of the present invention is described. The storage device of Example 5 utilizes a QP compatible with DC also for data transfer. As a result, as compared with the case where, when the number of nodes is n, the common QPs are used for all the nodes, the memory resource required for the QPs can be reduced to 2/n.

The QP compatible with DC has asymmetry of sending a request only to the DC target from the DC initiator. Therefore, there is a difference in the influence of an error between a case where the DC target causes an error and a case where the DC initiator causes an error.

First, the case where the DC initiator causes an error is described. One DC initiator can send a request to a plurality of DC targets. When a certain DC initiator causes the transition to Error state, the DC initiator will stop sending a request, and therefore the Local ACK Timeout as illustrated in FIG. 6 does not occur. However, there is a necessity of re-creating or resetting the DC initiator and all the DC targets with which the DC initiator is communicating. Then, the storage device of Example 5 notifies the node to which all the DC targets, with which the DC initiator is communicating, belong of the error using error notification QPs.

Next, the case where the DC target causes an error is described. One DC target can receive requests from a plurality of DC initiators. When an error is included in a request received from a certain DC initiator, the DC target causes the transition to Error state. When another DC initiator sends a request to the DC target which has caused the transition to Error state, the Local ACK Timeout occurs in the DC initiator sending the request later as with the case of FIG. 6 in which a QP causes an error without permission from a communication partner. Then, when the DC target causes the transition to Error state, the storage device of Example 5 notifies the node, to which all the DC initiators communicating with the DC target causing an error belong, of the error using error notification QPs.

FIG. 22 is a view explaining a QP error detection method in Example 5.

The node 1 (2000) has a DCI_U_1 (2201) for user data sending, a DCI_S_1 (2202) for control data sending, the DCT_1 (2005) for error notification reception, a DCT_U_1 (2203) for user data reception, a DCT_S_1 (2204) for control data reception, and the DCI_1 (2004) for error notification sending. Similarly the node i (2010) has a DCT_U_i (2211) for user data reception, a DCT_S_i (2212) for control data reception, the DCI_i (2014) for error notification sending, a DCI_U_i (2213) for user data sending, a DCI_S_i (2214) for control data sending, and the DCT_i (2015) for error notification receiving.

The DCI_U_1 (2201), the DCI_S_1 (2202), the DCI_1 (2004), the DCI_i (2014), the DCI_U_i (2213), and the DCI_S_i (2214) are DC initiators. The DCT_1 (2005), the DCT_U_1 (2203), the DCT_S_1 (2204), the DCT_U_i (2211), the DCT_S_i (2212), and the DCT_i (2015) are DC targets. The node 1 (2000) and the node i (2010) are connected by the IB link 2101 having the three virtual lanes 2030, 2031, and 2032.

The data transfer control program 2102 operating in the node 1 (2000) transfers user data by sending a request set to the service level 0 from the DCI_U_1 (2201) to the DCT_U_i (2211) of the node i (2010). The data transfer control program 2102 transfers control data by sending a request set to the service level 1 from the DCI_S_1 (2202) to the DCT_S_i (2212) of the node i (2010). The failure monitoring program 2103 operating in the node i (2010) checks the states of the DCT_U_i (2211), the DCT_S_i (2212), the DCI_U_i (2213), and the DCI_S_i (2214). When an error of the DCT_U_i (2211), the DCT_S_i (2212), the DCI_U_i (2213), or the DCI_S_i (2214) is detected, the failure monitoring program 2103 sends an error notification by sending a request set to the service level 2 from the DCI_i (2014) to the DCT_1 (2005) of the node 1 (2000). The data transfer control program 2102 acquires the error notification from a Completion Queue connected to the DCT_1 (2005).

The data transfer control program 2105 operating in the node i (2010) transfers user data by sending a request set to the service level 0 from the DCI_U_i (2213) to the DCT_U_1 (2203) of the node 1 (2000). The data transfer control program 2105 transfers control data by sending a request set to the service level 1 from the DCI_S_i (2214) to the DCT_S_1 (2204) of the node 1 (2000). The failure monitoring program 2104 operating in the node 1 (2000) checks the states of the DCI_U_1 (2201), the DCI_S_1 (2202), the DCT_U_1 (2203), and the DCT_S_1 (2204). When an error of the DCI_U_1 (2201), the DCI_S_1 (2202), the DCT_U_1 (2203), or the DCT_S_1 (2204) is detected, the failure monitoring program 2104 sends an error notification by sending a request set to the service level 2 from the DCI_1 (2004) to the DCT_i (2015) of the node i (2010). The data transfer control program 2105 acquires the error notification from a Completion Queue connected to the DCT_i (2015).

Processing for a failure QP and an involved QP is the same as the processing of Example 1 to Example 3. However, when an error of the DC initiator or the DC target of the node 1 (2000) is detected, the failure monitoring program 2104 sends an error notification also to nodes (node 2 to node n) other than the node i (2010).

Example 6

Figure 23:
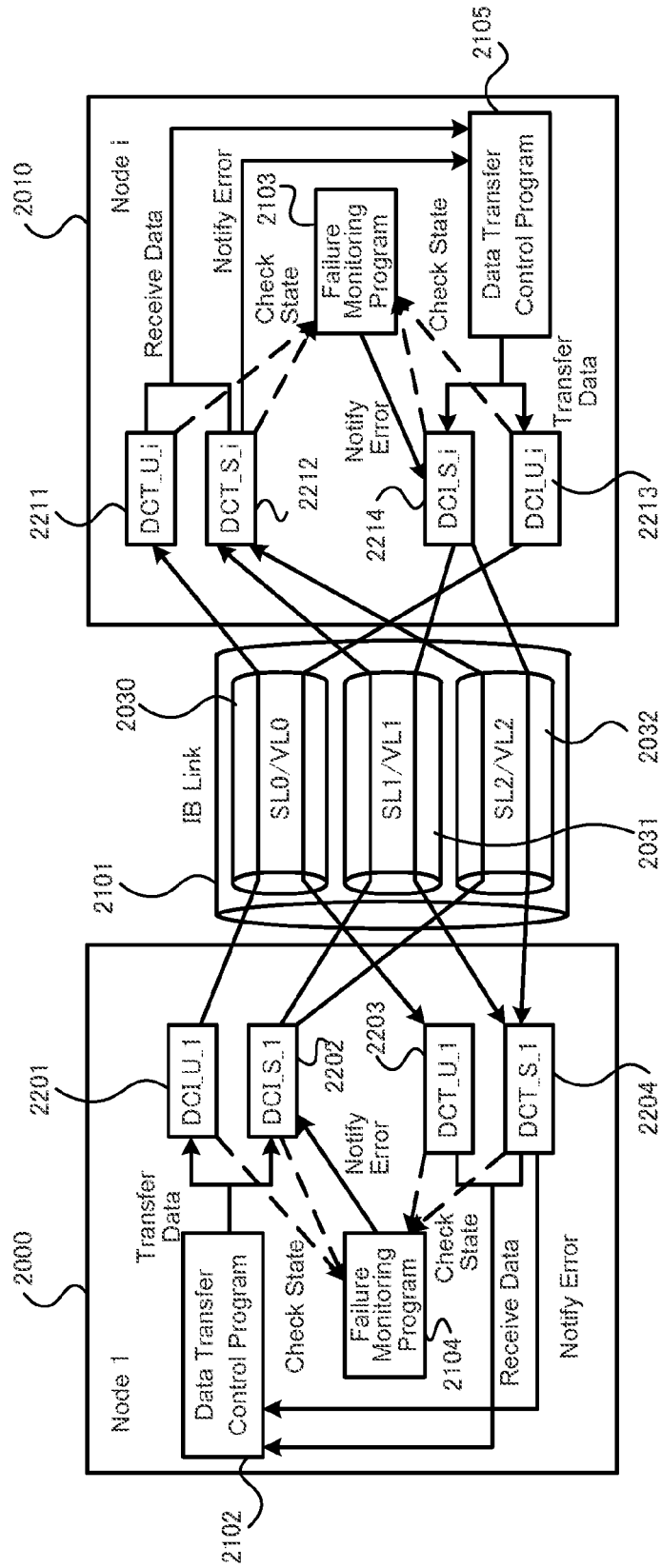
FIG. 23 is a view explaining a QP error detection method in Example 6.

With reference to FIG. 23, a storage device of Example 6 of the present invention is described. The storage device of Example 6 is configured so that a QP compatible with DC is used both for control data transfer and for error notification. Alternatively, a QP compatible with DC may be configured so as to be used both for user data transfer and for error notification. FIG. 23 illustrates the configuration in which a QP compatible with DC is used both for control data transfer and for error notification.

By using a QP compatible with DC both for control data transfer (or for user data transfer) and for error notification, the memory resources required for error notification QPs can be reduced. The QP compatible with DC is limited to the request sending from the DC initiator to the DC target. Therefore, even when the DC initiator is used both for error notification and for sending a control data, an error of the DC target used both for control data transfer and for error notification can be detected and notified.

First, an operation when notifying an error of the DC initiator is described. When a DC initiator for user data sending causes an error, an error notification is sent from a DC initiator for control data sending. When a DC initiator for control data sending causes an error, an error notification is sent from a DC initiator for user data sending.

The data transfer control program 2102 operating in the node 1 (2000) transfers user data by sending a request set to the service level 0 from the DCI_U_1 (2201) to the DCT_U_i (2211) of the node i (2010). The data transfer control program 2102 transfers a control data by sending a request set to the service level 1 from the DCI_S_1 (2202) to the DCT_S_i (2212) of the node i (2010). The failure monitoring program 2104 operating in the node 1 (2000) checks the states of the DCI_U_1 (2201) and the DCI_S_1 (2202). When an error of the DCI_U_1 (2201) or the DCI_S_1 (2202) is detected, the failure monitoring program 2104 sends an error notification in which the service level 2 is set to a request from the DCI_S_1 (2202) (or DCI_U_1 (2201)) to the DCT_S_i (2212) (or DCT_U_i (2211)) of the node i (2010). The data transfer control program 2105 operating in the node i (2010) acquires the error notification from a Completion Queue connected to the DCT_S_i (2212) (or DCT_U_i (2211)).

The data transfer control program 2105 operating in the node i (2010) transfers user data by sending a request set to the service level 0 from the DCI_U_i (2213) to the DCT_U_1 (2203) of the node 1 (2000). Moreover, the data transfer control program 2105 transfers a control data by sending a request set to the service level 1 from the DCI_S_i (2214) to the DCT_S_1 (2204) of the node 1 (2000). The failure monitoring program 2103 operating in the node i (2010) checks the states of the DCI_U_i (2213) and the DCI_S_i (2214). When an error of the DCI_U_i (2213) or the DCI_S_i (2214) is detected, the failure monitoring program 2103 sends an error notification in which the service level 2 is set to a request from the DCI_S_i (2214) (or DCI_U_i (2213)) to the DCT_S_1 (2204) (or DCT_U_1 (2203)) of the node 1 (2000). The data transfer control program 2102 operating in the node 1 (2000) acquires the error notification from a Completion Queue connected to the DCT_S_1 (2204) (or DCT_U_1 (2203)).

Next, an operation when notifying an error of a DC target is described. When a DC target for user data reception and a DC target for control data reception cause an error, an error notification is sent from a DC initiator for control data sending.

The failure monitoring program 2104 operating in the node 1 (2000) checks the states of the DCT_U_1 (2203) and the DCT_S_1 (2204). When an error of the DCT_U_1 (2203) or the DCT_S_1 (2204) is detected, the failure monitoring program 2104 sends an error notification in which the service level 2 is set to a request from the DCI_S_1 (2202) to the DCT_S_i (2212) of the node i (2010). The data transfer control program 2105 operating in the node i (2010) acquires the error notification from a Completion Queue connected to the DCT_S_i (2212).

The failure monitoring program 2103 operating in the node i (2010) checks the states of the DCT_U_i (2211) and the DCT_S_i (2212). When an error of the DCT_U_i (2211) or the DCT_S_i (2212) is detected, the failure monitoring program 2103 sends an error notification in which the service level 2 is set to a request from the DCI_S_i (2214) to the DCT_S_1 (2204) of the node 1 (2000). The data transfer control program 2102 operating in the node 1 (2000) acquires the error notification from a Completion Queue connected to the DCT_S_1 (2204).

Processing for the failure QP and involved QP is the same as the processing of Example 1 to Example 3. However, when information required for the creation of a Queue Pair compatible with DC and the transition to the state which allows data transfer is larger than 32 bits, and thus cannot be stored in the Immediate Data, the failure monitoring program or the data transfer control program sets the sending destination address of the RDMA Write with Immediate request, the data transfer length, and the number of Scatter Gather lists as necessary, and then sends required information. In this case, the failure monitoring program or the data transfer control program receiving error notification reads information except the information stored in the Immediate Data from a predetermined address. In the same manner as in Example 5, when an error of the DC initiator or the DC target of the node 1 (2000) is detected, the failure monitoring program 2104 sends error notification also to nodes (node 2 to node n) other than the node i (2010).

As described above, the invention which has been made by the present inventors is specifically described based on the embodiments but it is a matter of course that the present invention is not limited to the above-described embodiments and can be variously altered without deviating from the scope thereof.

For example, the present invention can be widely applied not only to a storage device in which InfiniBand is applied to an internal network but to various information processing systems, such as a server device.

DESCRIPTION OF REFERENCE NUMERALS

700, 701 Storage node
702, 705 Data transfer control program
703, 704 Failure monitoring program
710 to 715 QP
720 to 722 Virtual lane
730 IB link

The invention claimed is:
1. A storage device comprising:
a plurality of storage nodes, each of which has a plurality of logical ports having send and receive queues for a communication request and an identification number; and
an internal network interconnecting the plurality of storage nodes, wherein
a first storage node among the plurality of storage nodes has, as the logical ports, a first data communication logical port used for data communication with a second storage node and a first error communication logical port used in order to notify the second storage node of a state of the first data communication logical port,
the second storage node among the plurality of storage nodes has, as the logical ports, a second data communication logical port used for data communication with the first storage node in the logical port serving as a communication destination of the first data communication logical port and a second error communication logical port used in order to notify the first storage node of a state of the second data communication logical port, and
when detecting transition of the first data communication logical port to an error state, the first storage node notifies the second storage node of an identification number and a state of the first data communication logical port using the first error communication logical port.

2. The storage device according to claim 1, wherein information transfer using the first error communication logical port is carried out with priority higher than priority of information transfer using the first data communication logical port.

3. The storage device according to claim 1, wherein when detecting transition of the first data communication logical port to the error state,
the first storage node discards the first data communication logical port,
creates a third data communication logical port used for data communication with the second storage node, and then
notifies the second storage node of an identification number of the third data communication logical port created above using the first error communication logical port.

4. The storage device according to claim 3, wherein when receiving a notification including the identification number and the error state of the first data communication logical port,
the second storage node discards the second data communication logical port,
creates a fourth data communication logical port used for data communication with the first storage node, and then
notifies the first storage node of an identification number of the fourth data communication logical port created above using the second error communication logical port.

5. The storage device according to claim 4, wherein the first storage node causes transition of a state of the third data communication logical port to a state which allows sending and receiving of a request, and then notifies the second storage node of the identification number and the state of the third data communication logical port, and
the second storage node causes transition of a state of the fourth data communication logical port to a state which allows sending and receiving of a request, and then notifies the first storage node of the identification number and the state of the fourth data communication logical port.

6. The storage device according to claim 4, wherein information transfer using the second error communication logical port is carried out with priority higher than priority of information transfer using the second data communication logical port.

7. The storage device according to claim 1, wherein the first storage node detects transition of the first data communication logical port to the error state by periodically acquiring the state of the first data communication logical port.

8. The storage device according to claim 1, wherein when detecting transition of the first data communication logical port to the error state,
the first storage node causes transition of a state of the first data communication logical port to a reset state, and then causes transition of the state to a state which allows sending and receiving of a request, and
after the transition of the state of the first data communication logical port to the state which allows sending and receiving of a request, notifies the second storage node of the identification number and the state of the first data communication logical port.

9. The storage device according to claim 1, wherein the first data communication logical port is the logical port used also for data communication with the storage node other than the second storage node, and
the first storage node also notifies the storage node other than the second storage node of the state of the first data communication logical port.

10. The storage device according to claim 9, wherein the first storage node has a control data communication logical port used for data communication with the second storage node in addition to the first data communication logical port, and
when detecting transition of the first data communication logical port to an error state,
the first storage node notifies the second storage node of the identification number and the state of the first data communication logical port using the control data communication logical port.

11. The storage device according to claim 1, wherein the first storage node further has a fifth data communication logical port used for data communication with a third storage node which is one of the plurality of storage nodes, and
the first error communication logical port is used in order to notify the third storage node of a state of the fifth data communication logical port in addition to notifying the second storage node of the state of the first data communication logical port.

12. The storage device according to claim 1, wherein the internal network is a network of an InfiniBand standard, and
the logical port is a Queue Pair.

13. The storage device according to claim 12, wherein when notifying the identification number and the state of the first data communication logical port or the second data communication logical port, the storage node performs the notification by creating a request in which the identification number and the state are set to an Immediate Data of an RDMA Write with Immediate operation, and then posting the request to the Queue Pair.

14. A method for controlling a storage device having:
a plurality of storage nodes, each of which has a plurality of logical ports having send and receive queues for a communication request and an identification number; and
an internal network interconnecting the plurality of storage nodes, wherein
a first storage node among the plurality of storage nodes has, as the logical ports, a first data communication logical port used for data communication with a second storage node and a first error communication logical port used in order to notify the second storage node of a state of the first data communication logical port, and
the second storage node among the plurality of storage nodes has, as the logical ports, a second data communication logical port used for data communication with the first storage node in the logical port serving as a communication destination of the first data communication logical port and a second error communication logical port used in order to notify the first storage node of a state of the second data communication logical port, the method wherein
when detecting transition of the first data communication logical port to an error state, the first storage node notifies the second storage node of an identification number and a state of the first data communication logical port using the first error communication logical port.

15. The method for controlling a storage device according to claim 14, wherein
when detecting transition of the first data communication logical port to the error state,
the first storage node discards the first data communication logical port,
creates a third data communication logical port used for data communication with the second storage node, and then
notifies the second storage node of an identification number of the third data communication logical port created above using the first error communication logical port.

16. The method for controlling a storage device according to claim 14, further comprising, when receiving a notification including the identification number and the error state of the first data communication logical port, the second storage node:
discarding the second data communication logical port;
creating a fourth data communication logical port used for data communication with the first storage node; and then
notifying the first storage node of an identification number of the fourth data communication logical port created above using the second error communication logical port.

17. The method for controlling a storage device according to claim 16, further comprising:
the first storage node causing transition of a state of the third data communication logical port to a state which allows sending and receiving of a request, and then notifying the second storage node of the identification number and the state of the third data communication logical port, and
the second storage node causing transition of a state of the fourth data communication logical port to a state which allows sending and receiving of a request, and then notifying the first storage node of the identification number and the state of the fourth data communication logical port.

18. The method for controlling a storage device according to claim 16, further comprising:
carrying out information transfer, using the second error communication logical port, with priority higher than priority of information transfer using the second data communication logical port.

19. The method for controlling a storage device according to claim 14, further comprising, when detecting transition of the first data communication logical port to the error state, the first storage node:
causing transition of a state of the first data communication logical port to a reset state, and then causing transition of the state to a state which allows sending and receiving of a request; and then
after the transition of the state of the first data communication logical port to the state which allows sending and receiving of a request, notifying the second storage node of the identification number and the state of the first data communication logical port.

20. The method for controlling a storage device according to claim 14, wherein the first data communication logical port is the logical port used also for data communication with the storage node other than the second storage node, and wherein the first storage node has a control data communication logical port used for data communication with the second storage node in addition to the first data communication logical port, the method further comprising,
the first storage node also notifying the storage node other than the second storage node of the state of the first data communication logical port; and
when detecting transition of the first data communication logical port to an error state, the first storage node notifying the second storage node of the identification number and the state of the first data communication logical port using the control data communication logical port.

* * * * *